United States Patent [19]
Santos et al.

[11] Patent Number: 5,781,748
[45] Date of Patent: Jul. 14, 1998

[54] COMPUTER SYSTEM UTILIZING TWO ISA BUSSES COUPLED TO A MEZZANINE BUS

[75] Inventors: Gregory N. Santos, Cypress; David J. Maguire, Spring; Dwight D. Riley, Houston, all of Tex.; James R. Edwards, Longmont, Colo.

[73] Assignee: Compaq Computer Corporation, Houston, Tex.

[21] Appl. No.: 671,316

[22] Filed: Jul. 19, 1996

[51] Int. Cl.⁶ ............................................. H01J 13/00
[52] U.S. Cl. ..................... 395/308; 395/309; 395/306; 395/284; 395/285; 395/822
[58] Field of Search ............................ 395/308, 309, 395/281, 282, 283, 284, 285, 287, 300, 306, 728, 310, 311, 842, 847, 851, 856, 857, 863, 822

[56] References Cited

U.S. PATENT DOCUMENTS

| | | | |
|---|---|---|---|
| 5,557,758 | 9/1996 | Bland et al. | 395/308 |
| 5,559,968 | 9/1996 | Stancil et al. | 395/306 |
| 5,568,621 | 10/1996 | Wooten | 395/292 |
| 5,572,688 | 11/1996 | Sytwu | 395/309 |
| 5,588,125 | 12/1996 | Bennett | 395/306 |
| 5,594,882 | 1/1997 | Bell | 395/421.02 |
| 5,596,729 | 1/1997 | Lester et al. | 395/308 |
| 5,621,900 | 4/1997 | Lane et al. | 395/300 |
| 5,642,489 | 6/1997 | Bland et al. | 395/308 |
| 5,673,400 | 9/1997 | Kenny | 395/309 |
| 5,680,556 | 10/1997 | Begun et al. | 395/311 |

OTHER PUBLICATIONS intel® 8237A High Performance Programmable DMA Controller (8237A, 8237A-4, 8237A-5); Oct. 1987 (pp. 2-222-2-258).
Technology Kernels, Hang On! Here's another approach to hot docking; Portable Design, Jul. 1996 (pp. 19-26).
PCI, Revision 2.1, A100910-940 (pp. 35-55); Jun. 1, 1995.

Primary Examiner—Ayaz R. Sheikh
Assistant Examiner—Raymond N. Phan
Attorney, Agent, or Firm—Pravel, Hewitt, Kimball & Krieger

[57] ABSTRACT

A computer system having an expansion base for docking a portable portion of the computer system includes a bridge circuit for adaptively decoding addresses on a bus based on the docking status. Both the expansion base and the portable portion include the bridge circuit for passing cycles from a peripheral component interconnect (PCI) bus to an industry standard architecture (ISA) bus. The bridge includes internal devices and configuration registers for controlling the decoding. Bus cycles intended for internal devices and external devices connected to each respective ISA bus of the bridge circuits are positively decoded. Cycles not positively decoded and claimed are subtractively decoded by one of the bridge circuits depending on the docking status.

19 Claims, 13 Drawing Sheets

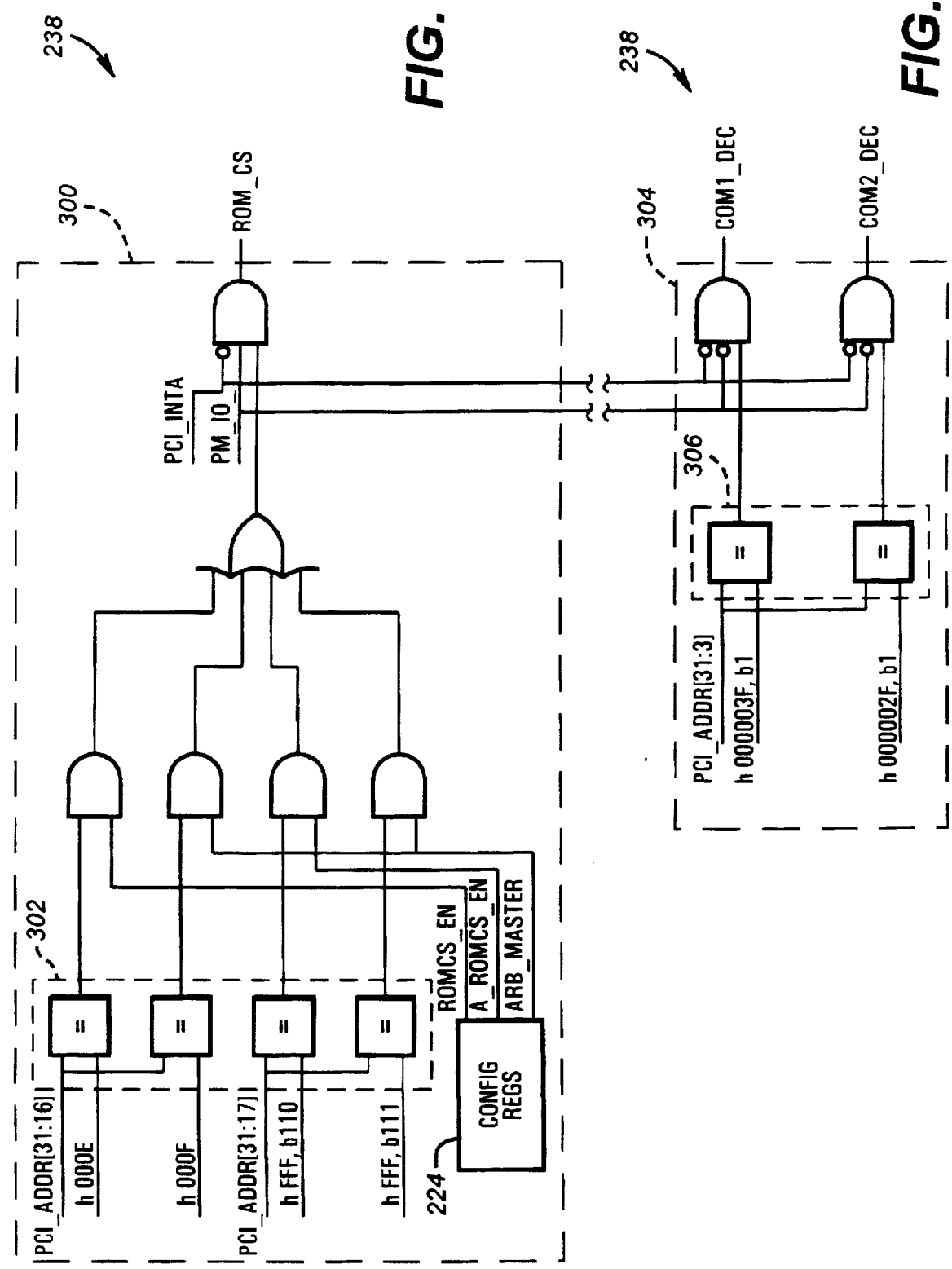

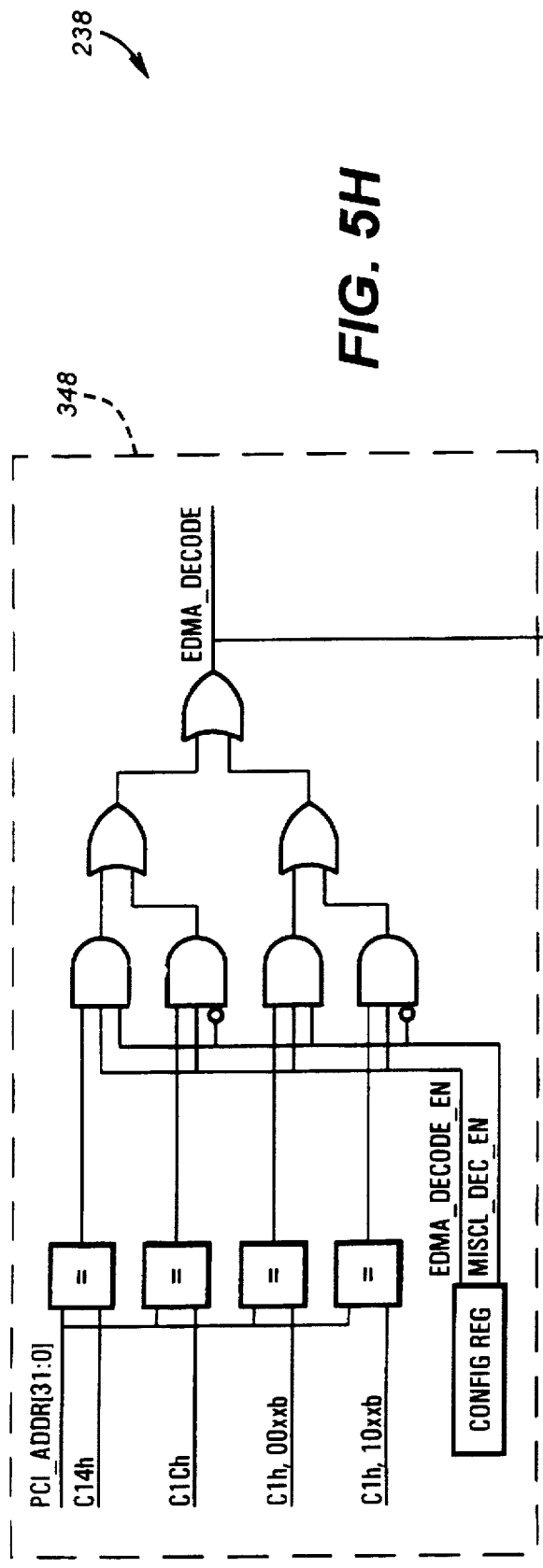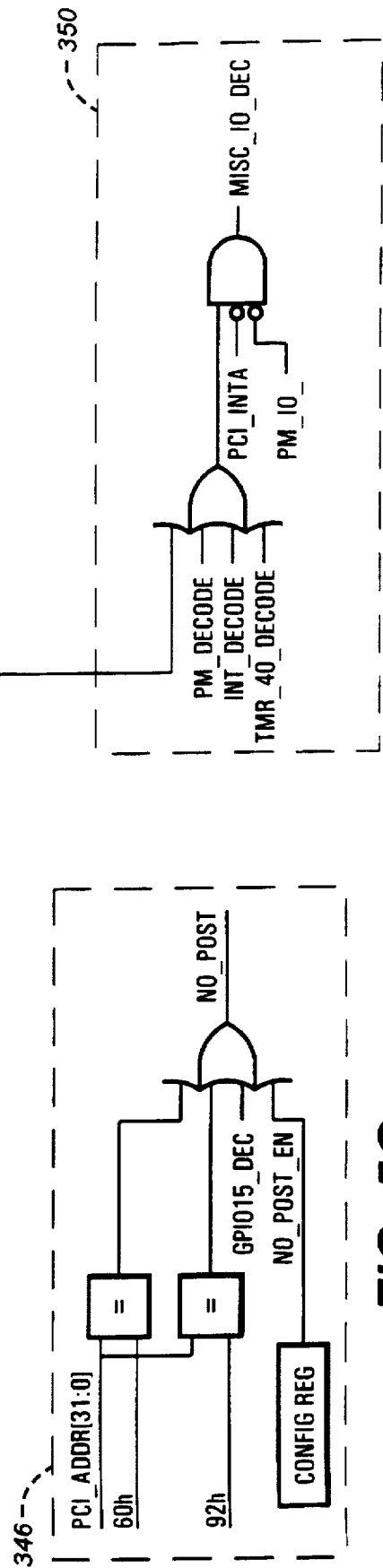
FIG. 5H
FIG. 5I
FIG. 5G

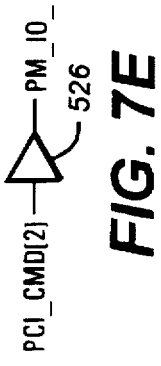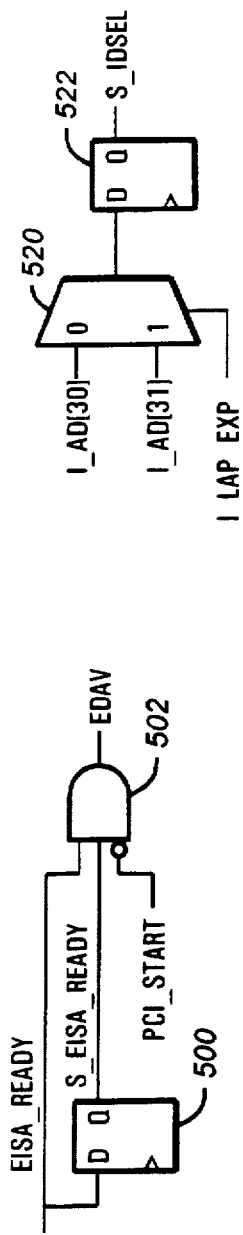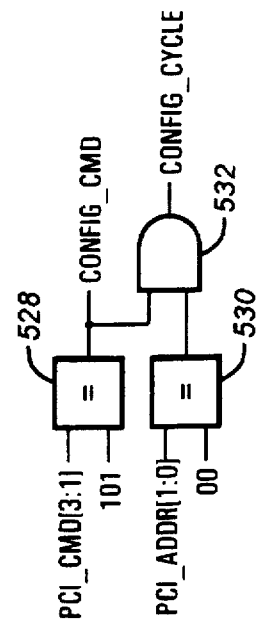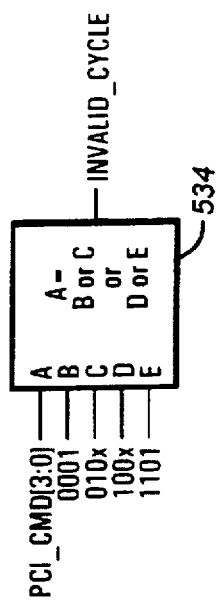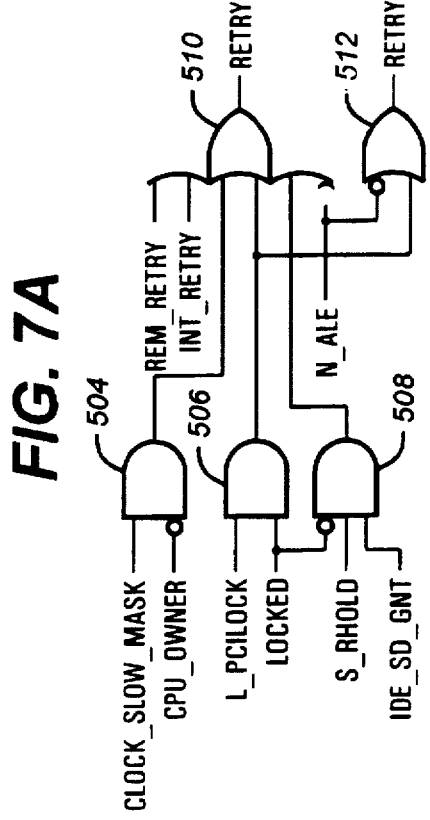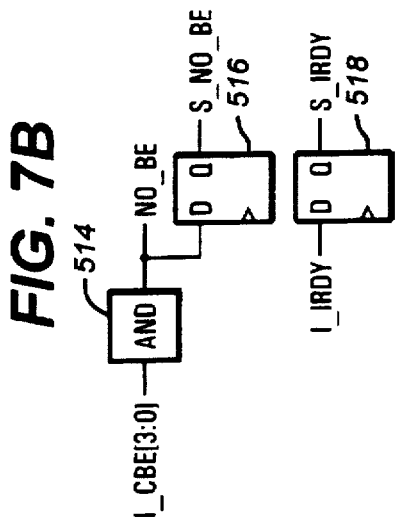

COMPUTER SYSTEM UTILIZING TWO ISA BUSSES COUPLED TO A MEZZANINE BUS

BACKGROUND OF THE INVENTION

1. Field of the Invention

The invention relates to adaptively decoding addresses on a computer bus and more particularly to an apparatus and method for positively and subtractively decoding addresses on a computer bus, especially the peripheral component interconnect (PCI) bus, when the decoding is determined based upon computer configuration.

2. Description of the Related Art

Personal computers are constantly evolving to provide the user with the highest performance available at the lowest cost. Performance improvements in the microprocessor and memory systems have resulted in computers so powerful that they are now capable of performing tasks that before could only be performed by large mainframe computers. Technological change is especially exemplified in the area of portable computers where power consumption efficiency is balanced against features, cost, size, weight and performance. This is especially challenging since many computer users desire the portable computer to provide nothing less than what a desktop unit can provide. In this specification, the term "portable computer" is used broadly here to denote the class of computers powered by battery or solar power. Those familiar with portable computers will recognize labels such as: portable, luggable, laptop, notebook and handheld which are used to designate certain marketing segments of the larger portable computer market.

Many options are available to the computer system designer. While simply designing around the highest performance processor available will go a long way towards providing a high performance product, in todays competitive market it is not enough. The processor must be supported by high performing components including a high performance input/output (I/O) bus. Several standardized I/O buses are available to the system designer including: ISA (Industry Standard Architecture); EISA (Extended Industry Standard Architecture); and PCI (Peripheral Component Interface). Today's computers are typically designed with some combination of the three to provide the user with the performance of PCI and backward compatibility to ISA. These three buses are familiar to those skilled in the art.

Design choices also involve certain special features of the computer that distinguish one manufacturer's computer from a competitors. In the portable computer market this is especially challenging since added features can cause increased size and weight. For example, since software can require large amounts of storage, a high capacity hard disk drive is often desirable. However, high capacity disk drives are usually much larger and heavier than desirable for a portable computer. It is also desirable to have the ability to add functionality to the portable computer. However, providing expansion bays compromises the small size.

One known method of providing certain features without sacrificing size and weight is through the use of an expansion base unit. An expansion unit is a non-portable unit that typically operates from AC power and resides on the user's desktop. When the user is working at the desk, the portable computer plugs into the expansion unit to provide the added functionality. For example, the expansion unit may have a network interface unit for connecting to a local area network, a high capacity disk drive, a floppy drive and other peripherals. An additional hard drive may also be resident in the expansion base unit.

The connection between the portable computer and the expansion base unit is typically proprietary since no standard has yet evolved. One known way to couple the portable computer to the expansion base unit is through the existing I/O bus. In a portable computer having a PCI bus and an ISA bus, either bus might be used to connect to the expansion base unit. For it high performance alone, the PCI bus is preferable. Additionally, the PCI bus offers a 32-bit multiplexed address and data bus which also makes the PCI bus desirable because of its small connector size requirements.

The PCI bus defines three physical address spaces: memory, I/O space and configuration space. Address decoding on the PCI bus is distributed; i.e. each device coupled to the PCI bus performs address decoding. The PCI specification defines two styles of address decoding: positive and subtractive. Positive decoding is faster since each PCI device is looking for accesses in the address range(s) the device has been assigned. Subtractive decoding can be implemented by only one device on the PCI bus since the subtractive decoding device accepts all accesses not positively decoded by some other agent. This decode mechanism is slower since it must give all other bus agents a "first right of refusal" on the access before it is claimed by the subtractive decoding device. However, it is very useful for an agent such as a standard expansion bus that must respond to a highly fragmented address space. More details on the PCI bus and particularly PCI addressing are found in the PCI Local Bus Specification, Production Version, Revision 2.1, dated Jun. 1, 1995, which is published by the PCI Special Interest Group of Hillsboro, Oreg.

The addressing mechanism of the PCI bus does not lend itself to the portable computer with expansion base unit design. As a standalone unit, the portable computer must handle the positive and subtractive decoding on the PCI bus. However, when coupled to the base unit, if subtractive decoding is maintained as was done when it was configured as a standalone unit, the PCI devices on the expansion base unit may conflict as both the PCI devices on the expanion base unit and the subtractive decoding device attempt to claim the PCI transaction. Furthermore, if the PCI address is delayed before it reaches the expansion base unit, the subtractive decoder device may claim the transaction before the expansion base unit is allowed to decode the address and thereby effectively lock out the devices on the expansion base unit. Therefore, a solution to this problem is desirable since coupling the expansion base unit to the portable computer with the PCI bus will provide a very high performance interface between the portable computer and the expansion base unit.

SUMMARY OF THE PRESENT INVENTION

According to the preferred embodiment of the present invention, a dual-use bridge device has configurable decode logic for decoding PCI accesses. The bridge is conveniently designed for use in a laptop computer and in an expansion base, to which the laptop computer may dock or connect. In the laptop computer, a first bridge resides between a peripheral component interconnect (PCI) bus and a first industry standard architecture (ISA) bus. In the expansion base, a second bridge resides between the PCI bus and a second ISA bus. The PCI bus in the expansion base is connected to the PCI bus of the laptop computer when docked. In this configuration, when docked, each bridge receives cycles on the PCI bus for decoding and possibly passing to its ISA bus.

The bridge also includes configuration registers and internal devices, such as an interrupt controller, which are addressable at an input/output address without passing the cycle from one bus to another. The internal devices are configurable for use in the laptop computer or expansion base or sometimes both.

The decode logic is configured according to an input pin defining its use and the configuration registers. Use in either the laptop computer or the expansion base defines a certain set of internal devices for decoding. The configuration registers may also define address ranges of external devices residing on the first or second ISA buses.

The decode logic decodes PCI accesses for claiming bus cycles according to PCI conventions. If the laptop computer is undocked, the first bridge is configurable to subtractively decode cycles on the PCI bus. These cycles are then passed to the first ISA bus. The first bridge is also configurable to positively decode and claim all PCI bus cycles intended for the internal and external devices corresponding to the first bridge. If the laptop computer is docked, the first bridge is configurable to not subtractively decode cycles not positively decoded on the PCI bus. The second bridge is configurable to subtractively decode cycles on the PCI bus. Additionally, the second bridge is configurable to positively decode and claim all PCI bus cycles intended for the internal and external devices corresponding to the second bridge. Therefore, subtractive decoding is responsive to the docking status and configurable based on certain configuration registers and an input pin. The adaptive decoding of the present invention also makes possible a dual ISA bus system.

BRIEF DESCRIPTION OF THE DRAWINGS

A better understanding of the present invention can be obtained when the following detailed description of the preferred embodiment is considered in conjunction with the following drawings, in which:

FIGS. 5A-I are block diagrams illustrating logic for decoding a certain device select signals according to the preferred embodiment;

FIGS. 7A-G are detailed block diagrams illustrating logic for generating certain control signals of the MISC according to the preferred embodiment;

DETAILED DESCRIPTION OF THE PREFERRED EMBODIMENT

The following applications are hereby incorporated by reference:

U.S. application Ser. No.08/684,486, entitled "BUS SYSTEM FOR SHADOWING REGISTERS," by Dwight D. Riley and David J. Maguire, filed concurrently herewith;

U.S. application Ser. No. 08/684,412, entitled "CIRCUIT FOR HANDLING DISTRIBUTED ARBITRATION IN A COMPUTER SYSTEM HAVING MULTIPLE ARBITERS," by Dwight D. Riley, James R. Edwards and David J. Maguire, filed concurrently herewith;

U.S. application Ser. No. 08/684,485, entitled "LONG LATENCY INTERRUPT HANDLING AND INPUT/OUTPUT WHILE POSTING," by David J. Maguire and James R. Edwards, filed concurrently herewith;

U.S. application Ser. No. 08/684,710, entitled "SERIAL BUS SYSTEM FOR SHADOWING REGISTERS," by David J. Maguire and Hung Q. Le, filed concurrently herewith;

U.S. application Ser. No. 08/684,584, entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. application Ser. No. 08/684,490, entitled "RECONFIGURABLE DUAL MASTER IDE INTERFACE," by Gregory N. Santos, David J. Maguire, William C. Hallowell and James R. Edwards, filed concurrently herewith; and U.S. application Ser. No. 08/684,255, entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

Figure 1:
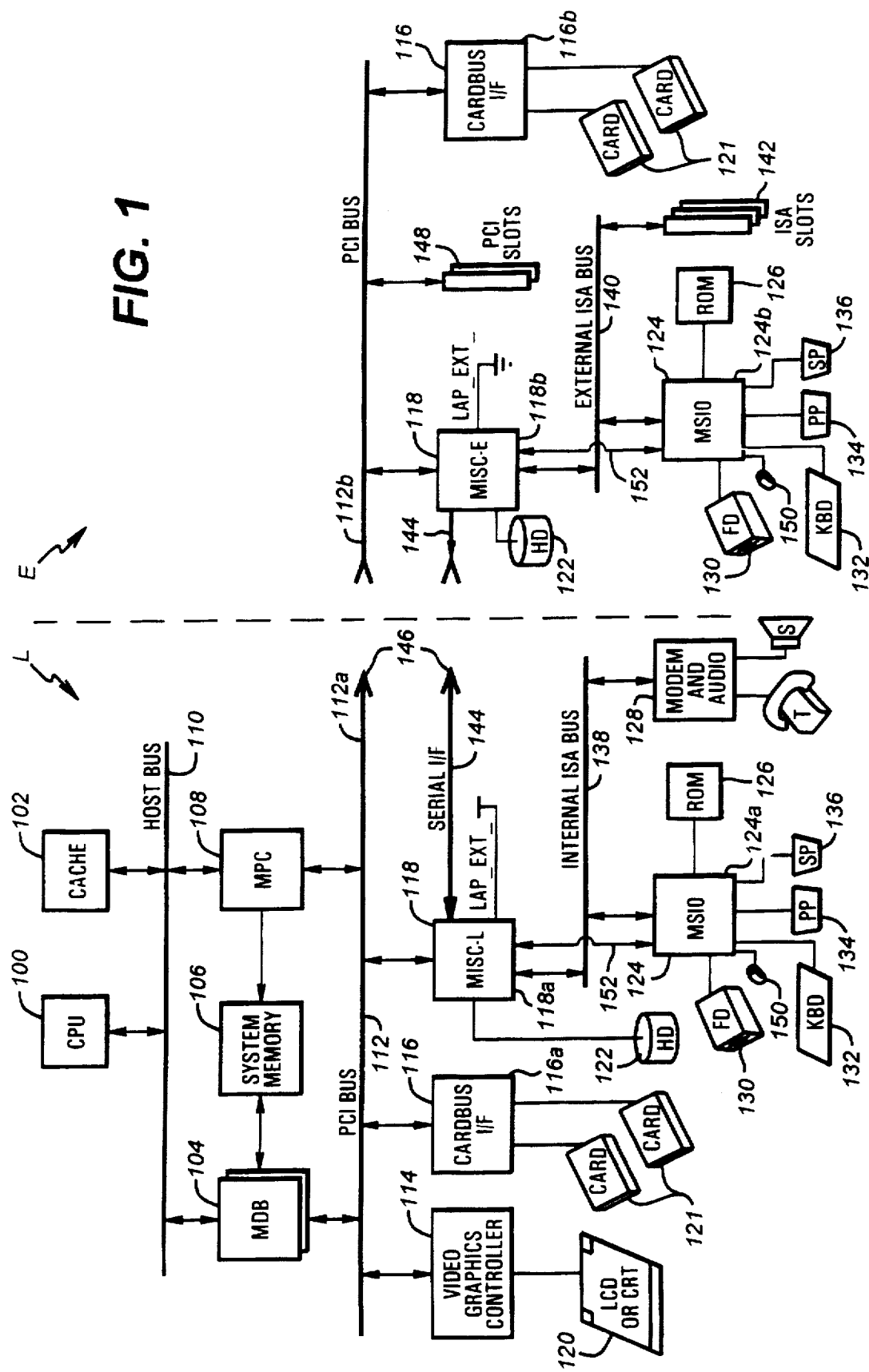
FIG. 1 is a block diagram illustrating the laptop computer system L and corresponding expansion base unit E of the preferred embodiment.

Referring now to FIG. 1, there is illustrated a block diagram of a computer system utilizing the present invention. The computer system is shown divided into a laptop portion L (hereinafter laptop computer L) and an expanion base unit portion E (hereinafter expansion base E). The laptop computer L is an operationally autonomous apparatus which is detachable from the expansion base E for remote computing operations. While the laptop computer L is docked into the expansion base E, the laptop computer L operates on AC power, and while the computer L is detached from the expansion base E the laptop computer L operates from battery power. Mechanisms are also provided to operate the laptop computer from AC power while removed from the expansion base E. The expansion base E typically provides expandibility for functions not included in the laptop portion L.

A Central Processing Unit (CPU) 100 is provided in the laptop computer L which is a conventional microprocessor, such as an Intel Pentium and equivalent microprocessors or other varieties of microprocessor. The CPU 100 couples to a host bus 110 for communicating with system logic such as a cache memory 102, a Mobile Peripheral component interconnect bus Cache controller (PC) 108 and a pair of Mobile Data Buffers (MDB) 104. The cache memory 102 is a conventional cache memory for the CPU 100 and preferably is comprised of high speed synchronous burst static Random Access Memories (RAM). The MPC 108 provides an interface to the cache memory 102 and includes tag RAMs and other logic for creating various cache ways, size, and speed configurations of the cache memory 102.

The MPC 108 and the MDB 104 also couple to a system memory 106 and a Peripheral Component Interconnect (PCI) bus 112. The reader is assumed to be familiar with the PCI bus or the PCI specification incorporated by reference in the background of this specification. The MPC 108 provides address and control to system memory 106, which is comprised of up to 256 MByte of conventional dynamic random access memories (DRAMs). The MDB 104 provides a 64-bit data path between the host bus 110 and the system memory 106 and provides a 32-bit data path to the PCI bus 112. The MPC 108 and MDB 104 are proprietary devices having three major functional interfaces: a processor/cache interface, a system memory interface, and a PCI bus interface. The MDB 104 is responsible for buffering data between the three interfaces while the MPC 108 is responsible for handling addressing, command and control. Each of these interfaces operates independantly from the other and includes queues for read and write posting between any two of the three interfaces. The processor/cache interface allows the CPU 100 to pipeline cycles into read cycles and allows snoop accesses to the tag RAM to occur while the pipeline cycles are executing. The memory interface controls the system memory 106 and generates control signals to the MDB 104. The interface also allows read ahead operations for those PCI masters issuing a read multiple command. The PCI interface allows MPC 108 to act as a PCI master when the CPU 100 is accessing the PCI bus 112, or as a PCI slave when a PCI device accesses system memory 106.

The PCI bus 112 provides a communications conduit between the laptop computer L and the expansion base E. A portion 112a of the PCI bus 112 resides in the laptop computer L and includes a quickswitch 146 for each signal of the PCI bus 112. The quickswitches 146 are low loss series in-line MOSFET devices with the gate connected to a docking detection means for providing hot plug capabilities. When the laptop computer L is docked into the expansion base E, a portion 112b of the PCI bus 112 in the expansion base E is coupled to the portion 112a to provide an extended PCI bus 112.

In the laptop computer L, the PCI bus 112a further couples to a video graphics controller 114, a cardbus interface 116 (particularly 116a) and a mobile integrated system controller (MISC) 118 (particularly 116b). In the expansion base E, the PCI bus 112b further couples to a second MISC 118 (particularly 118b), two PCI slots 148, and a second cardbus interface 116 (particularly 116b). The video graphics controller 114 further couples to a low power liquid crystal display (LCD) 120 or alternatively a cathode ray tube (CRT) style monitor. The cardbus interface 116 is provided for communicating with add-on cards 121 such as networking cards, modem cards, solid state storage cards and rotating storage cards preferably of a personal computer memory card international association (PCMCIA) style. The MISC 118 provides an industry standard architecture (ISA) bus 138 or 140, and an integrated drive electronics (IDE) hard drive interface for communicating with hard drives 122. The MISC 118 is configurable based on an input pin (LAP_EXT_) for use in both the laptop computer L, as MISC-L 118a, and expansion base E, as MISC-E 118b. As shown in FIG. 1, if LAP_EXT_ is pulled high, the MISC 118 is configured as MISC-L 118a, and if LAP_EXT_ is pulled low, the MISC 118 is configured as MISC-E 118b. Thus, two MISC devices, 118a and 118b are coupled to the PCI bus 112, with the MISC-L 118a coupled to the PCI bus portion 112a and the MISC-E 118b coupled to PCI bus portion 112b. The MISC-L is further coupled to the internal ISA bus 138 while the MISC-E is coupled to the external ISA bus 140. The reader is assumed to be familiar with the ISA bus.

A "_" or "#" symbol at the end of a signal name indicates that the signal's active state occurs when it is at a low voltage. The absence of the "_" or "#" symbol indicates that the signal is active at a high voltage.

As the general functionality of the MISC-L 118a and the MISC-E 118b are very similar, at this point they are discussed together for simplicity. The MISC 118 bridges the PCI bus 112 to the ISA bus 138/140 and acts as both a master and slave on the PCI bus 112 and a bus controller on the ISA buses 138 and 140. The MISC 118 further includes a PCI bus arbiter, an ISA bus arbiter, 8237 compatible direct memory access (DMA) controllers, an enhanced DMA controller for fast IDE hard drives, 8254 compatible timers, an 8259 compatible interrupt controller, hot docking support logic, system power managment logic, and plug and play support (all not shown in FIG. 1). Some components are disabled upon initialization by software to prevent conflicts of duplicate functions. In the the MISC 118 there is also a serial interrupt interface 144 for serially passing interrupts from the MISC-E 118b to the MISC-L 118a providing an interrupt architecture for supporting standard ISA interrupts in a PCI based system.

The MISC 118 and the ISA buses 138 and 140 provide support for standard ISA peripherals such as those combined in a mobile super input/output (MSIO) 124 peripheral. The MSIO 124 peripheral is a proprietary chip having a combination of standard ISA peripherals, such as: a 146818 compatible real time clock (RTC), a floppy controller for interfacing to standard floppy drives 130; an 8051 compatible microcontroller for communicating with a standard keyboard 132 and a pointing device 150, for performing scanning and key code conversions on the keyboard 132, and for performing power management functions; a universal asynchronous receiver transmitter (UART) for providing standard serial ports 136; and parallel port logic for a parallel port 134. A read only memory (ROM) 126 couples to the MSIO 124 for providing code to the 8051 microcontroller. Additionally, the ROM 126 provides basic input/output services (BIOS) code to the CPU 100 which is copied from the ROM 126 and shadowed in system memory 106 upon system initialization so that thereafter the 8051 microcontroller may access the ROM 126 without competing for access with the CPU 100. A serial bus 152 is provided for communicating information relating to power management and hot docking.

In the laptop computer L, a modem and audio peripheral 128 is also provided and coupled to the ISA bus 138. The modem and audio peripheral 128 includes a standard telephony communications port for coupling to a telephone T, and an interface for coupling to a pair of stereo speakers S. In the expansion base E, three ISA expansion slots 142 are provided for standard ISA cards.

Figure 2:
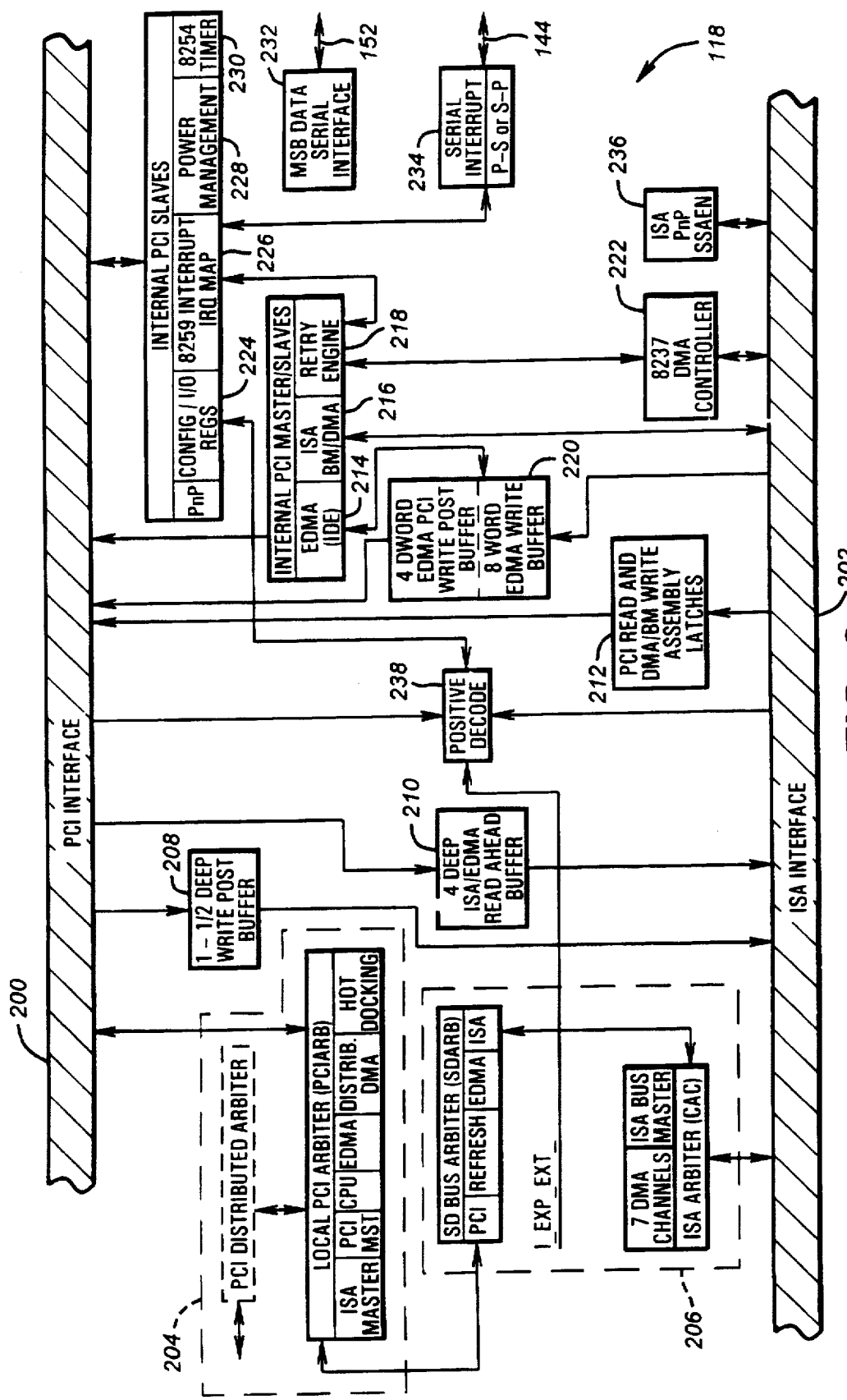
FIG. 2 is a block diagram illustrating a mobile integrated system controller (MISC) according to the preferred embodiment.

Now referring to FIG. 2 there is illustrated a detailed block diagram of the mobile integrated system controller (MISC) 118. The MISC 118 includes PCI interface logic 200 for acting as both a master and slave in a PCI bus 112 and ISA interface 202 for acting as a bus controller on ISA buses 138 and 140. The MISC 118 further includes a PCI bus arbiter 204, and ISA bus arbiter 206, a write post buffer 208, a read ahead buffer 210, and a write assembly latch 212. The MISC 118 further includes: internal PCI master/slave logic; an enhanced direct memory access (DMA) controller 214 including PCI write posting and EDMA write buffers 220; ISA bus master logic 216; and a retry engine 218 for supporting distributed DMA. The retry engine causes cycles intended for the DMA controllers to retried as distributed DMA cycles. The MISC 118 also incorporates a pair of DMA controllers 222 for supporting all seven ISA DMA channels for acting as a master DMA in the distributed DMA architecture. The MISC 118 also includes internal PCI slaves such as configuration registers 224, an 8259 compatible interrupt controller 226, power management logic 228, and an 8254 compatible timer 230.

The PCI configuration registers are 32-bit registers decoded from the PCI address bits 7-2 and command/byte enable bits 3-0 (C/BE|3:0|), when an initialization device select (IDSEL) signal is high and address/data bits 0-1 (AD|1:0|) are 00. IDSEL is a PCI signal conventionally used as a chip select during configuration read and write transactions to configuration registers. In the MISC 118, IDSEL is generated internally based on the LAP_EXT_signal. If LAP_EXT_ is high, the AD|31| signal is used as the IDSEL signal. If LAP_EXT_ is low, the AD|30| signal is used as the IDSEL signal. Thus, each MISC, MISC-L 118a and MISC-E 118b, have an identical set of configuration registers, but are addressed at a unique configuration address space. A list of the MISC 118 configuration registers according to the preferred embodiment is found in Table 1.

TABLE 1

MISC PCI CONFIGURATION REGISTERS

| PCI CONFIG. REG | R/W | REGISTER NAME |
|---|---|---|
| 01-00 | R | Vendor ID Register |
| 03-02 | R | Device ID Register |
| 05-04 | R/W | Command Register |
| 07-06 | R/W | Status Register |
| 08 | R | Revision ID Register |
| 09-0B | R | Class Code Register |
| 0E | R | Header Type Register |
| 40 | R/W | PCI Control Register 1 |
| 41 | R/W | PCI Control Register 2 |
| 44-45 | R/W | PCI/ISA Hole Register |
| 48 | R/W | ISA Address Decoder Control Register 1 |
| 49 | R/W | ISA Address Decoder Control Register 2 |
| 4A-4B | R/W | Minimum Grant Register |
| 52-53 | R/W | Top of Main Memory Register |
| 60-61 | R | PCI/IS Hole Register |
| 68 | R/W | Refresh Count Value Register |
| 69 | R/W | Additional Minimum Grant Register |
| 6B | R/W | Grant NIC Fix Enable Register |
| 6C-6F | R/W | MISC Test Mode Enable Register |
| 70-73 | R/W | Channel 1 IDE Timing Register |
| 74-77 | R/W | Channel 2 DE Timing Register |
| 78 | R/W | IDE Enable Register |
| 79 | R/W | IDE Channel 1 Base Address Register |
| 7A | R/W | IDE Channel 2 Base Address Register |
| 7C | R/W | MISC Option Register |
| 7E | R/W | Internal I/O Positive Decode Enable Register |
| 80-83 | R/W | External I/O Positive Decode Enable Reg. |
| 84-87 | R/W | Programmable I/O Positive Decode Register |
| 8A | R/W | MISC-L Grant Timer Register |
| 8B | R/W | MISC-E Grant Timer Register |
| 8C-8F | R/W | DMA Master Configuration Register |
| 90-9F | R/W | DMA Slave Configuration Registers |
| AC-AD | R/W | DMA Miscellaneous Register |
| AE | R/W | Interrupt Index Register |
| AF | R/W | Interrupt Mapping Register |
| B0 | R/W | Interrupt Serial Bus Configuration Register |
| B2-B3 | R/W | Interrupt Blocking Register |
| B4-B6 | R/W | DMA DRQ/DAK Assignment Register |
| B7 | R/W | PCI Error Status Register |
| B8 | R/W | MSBGPIO Configuration Register |

Serial interface logic 232 is included for communicating to the MSIO 124 over the serial bus 152. Serial interrupt logic 234 is also included for communicating interrupts between the MISC-E 118b and the MISC-L 118a over the serial interrupt bus 144. ISA plug and play logic 236 is included for configuring plug and play compatible ISA devices on the ISA bus 138 and 140. Each of these internal functions includes a number of I/O registers. A list of the MISC 118 internal I/O registers according to the preferred embodiment is found in Table 2. It is noted that certain registers are assigned to the MISC-L 118a or the MISC_E 118b, while other registers are distributed between the MISC-L 118a and the MISC_E 118b and still other registers are shared by the MISC-L 118a and the MISC_E 118b. The arrangement is based on an internal I/O positive decode enable configuration register. This register is represented in the figures as configuration register 224 and described in Table 3.

TABLE 2

MISC INTERNAL I/O REGISTERS

| I/O ADDRESS | R/W | REGISTER NAME | MISC Device |
|---|---|---|---|
| 00h-0Fh | R/W | DMA Channel 0-3 Registers | MISC-L Dist. |
| 10h | R/W | Software SMI Register | MISC-L |
| 11h | R/W | SMI Data Register | MISC-L |
| 20h-21h | R/W | Master Interrupt Controller Registers | MISC-L |
| 40h-43h | W | System Timer Registers | MISC-L |
| 61h | R/W | NMI Status Register | MISC-L |
| 70h | R/W | NMI Enable/Disable Reg. (Bit 7 Only) | MISC-L |
| 80h-8Fh | R/W | DMA Page Registers | MISC-L Dist. |
| A0h-A1h | R/W | Slave Interrupt Controller Registers | MISC-L |
| C0b-DFh | R/W | DMA Channel 4-7 Registers | MISC-L Dist |
| E6h | R/W | Power Management Laptop Index Reg. | MISC-L |
| E7h | R/W | Power Mngmt Expansion Index Reg. | MISC-E |
| E8h-EBh | R/W | Power Mngmt Laptop Data Registers | MISC-L |
| Ech-EFh | R/W | Power Mngmt Expansion Data Reg. | MISC-E |
| F0h | R/W | NCP Error Register (Bit 7 Only) | MISC-L |
| 40Bh | W | DMA Channel 0-3 Extended Mode Reg. | MISC-L |
| 4D0h-4D1h | R/W | Interrupt Edge/Level Control Registers | MISC-L |
| 4D6h | W | DMA Channel 4-7 Extended Mode Reg. | MISC-L Dist |
| 800-83F* | R/W | Distributed DMA Channel I/O Registers 0-3 | MISC-L/E |
| 850-87F* | R/W | Distributed DMA Channel I/O Registers 5-7 | MISC-L/E |
| C10h-C13h | R/W | EDMA Laptop Data Registers | MISC-L |
| C14h | R/W | EDMA Laptop Index Register | MISC-L |
| C18h-C1B | R/W | EDMA Expansion Data Registers | MISC-E |
| C1Ch | R/W | EDMA Expansion Index Register | MISC-E |
| 48h | R/W | Plug-n-Play Slot Specific AEN Reg. | MISC-E |
| 49h | W | Plug-n-Play Rise Time Measurement Enable Reg. | MISC-E |
| 4Ah | R | Plug-n-Play Rise Time Measurement Value Reg. | MISC-E |
| C6Ch | R/W | ISA Expansion Wait Delay Register | MISC-E |
| C6Dh | R/W | ISA Laptop Wait Delay Register | MISC-L |

TABLE 3

MISC INTERNAL I/O POSITIVE DECODE ENABLE CONFIGURATION REGISTER

| BITS | R/W | DESCRIPTION |
|---|---|---|
| 7-4, 2-1 | | N/A |
| 3 | R/W | Subtractive Decode Enable<br>1 MISC will become the subtractive decoder on the PCI bus<br>0 MISC will accept cycles only on positively decoded addresses |
| 0 | R/W | MISC-L Decode Enable<br>1 MISC will positively decode I/O addresses mapped to MISC-L<br>0 MISC will not positively decode I/O addresses mapped to MISC-L |

In the internal I/O positive decode enable configuration register, a MISC-L decode enable bit is included to disable positive decoding of I/O addresses in the MISC 118, as shown in Table 3. Software sets bit 0 in the MISC-L 118a upon initialization of the computer system C so that the MISC-L 118a will positively decode I/O addresses mapped to the MISC-L. This bit is cleared in the MISC-E 118b, so that the MISC-E will not positively decode I/O addresses mapped to the MISC-L 118a.

For PCI initiated I/O cycles, the MISC 118 will decode the I/O address to determine if the I/O cycle is to an internal MISC I/O register, a distributed DMA I/O register or to a device mapped onto the ISA bus 138 or 140. If the PCI initiated I/O cycle is directed to a distributed DMA register, the distributed DMA protocol is initiated by the MISC-L 118a and the MISC-E 118b. More information on distributed DMA is found in U.S. patent application Ser. No. 08/570, 394, entitled "INTERFACING DIRECT MEMORY ACCESS DEVICES TO A NON-ISA BUS", and hereby incorporated by reference. If the PCI initiated I/O cycle is directed to a device mapped onto the ISA bus 138 or 140, the respective MISC-L 118a or MISC-E 118b passes the cycle to the ISA bus. The MISC-L positively decodes I/O accesses to devices mapped to ISA bus 138 and, if the MISC-E 118b is not present, may also subtractively decode the I/O address. If the MISC-E 118b is present in the computer system C, the MISC-E 118b is the subtractive decode agent and always subtractively decodes I/O accesses to devices mapped to its ISA bus 140. To uniquely set the subtractive decode agent as the MISC-L or the MISC-E, bit 3 in the internal I/O positive decode enable configuration register is set in either the MISC-L 118a or the MISC-E 118b. Therefore, two ISA buses are present in the laptop computer L when it is docked into the expansion base E, and decoding of ISA devices is handled with the adaptive decoding of the MISC 118 device. The duplicate ISA functions of the MISC-L 118a and MISC-E 118b devices are selectably enabled for use on the ISA bus 138 or ISA bus 140.

An external I/O positive decode enable configuration register in the MISC 118 selectively controls the positive decode of several external I/O address ranges. This register is also represented as configuration register 224. A list of these external I/O address ranges is found in Table 4. The external I/O positive decode enable configuration register is enabled in the MISC-L 118a when bit 0 of the internal I/O positive decode configuration register of the MISC-L is set. This bit is cleared in the MISC-E 118b at initialization, thereby disabling positive decoding of these external I/O address ranges in the MISC-E 118b. Thus, external I/O devices not enabled in the external I/O positive decode enable configuration register of the MISC-L 118a are subtractively decoded by the MISC-E 118b and passed to ISA bus 140.

Therefore, of particular interest to the MISC 118 is the address decoding mechanism for PCI address which includes the PCI interface 200, a positive decoder 238, the configuration registers 224, and the retry engine 218.

TABLE 4

MISC EXTERNAL I/O DECODE MAP

| I/O DEVICE | MISC MAPPING | ADDRESS RANGE |
|---|---|---|
| Keyboard | MISC-L | 60h, 64h, 65h |
| CMOS RTC | MISC-L or MISC-E | 70h–77h |
| Port 92 | MISC-L | 92h |
| ESS Audio Software Configuration | MISC-L | E0h–E1h |

TABLE 4-continued

MISC EXTERNAL I/O DECODE MAP

| I/O DEVICE | MISC MAPPING | ADDRESS RANGE |
|---|---|---|
| MSIO-L Index Address & Data | MISC-L | E2h–E3h |
| MSIO-E Index Address & Data | MISC-E | E4h–E5h |
| MSIO-L/BGL/Audio Configuration | MISC-L | F9h–FBh |
| MSIO-L/BGL/Audio Configuration | MISC-E | Fdh–FFh |
| First Modem | MISC-L or MISC-E | 130h–131h |
| Primary UTE Audio | MISC-L or MISC-E | 134h–137h |
| Second Modem | MISC-L or MISC-E | 140h–141h |
| IDE Channel 2 (Secondary) | MISC-L or MISC-E | Programmable (Default 170h–177h, 376h) |
| IDE Channel 1 (Primary) | MISC-L or MISC-E | Programmable (Default 1F0h–1F7h, 3F6h) |
| Joystick | MISC-L or MISC-E | 201h |
| Secondary UTE Audio | MISC-L or MISC-E | 208h–20Bh |
| ESS Audio Register 1 | MISC-L or MISC-E | 220h–22Fh |
| ESS Audio Register 2 | MISC-L or MISC-E | 230h–23Fh |
| ESS Audio Register 3 | MISC-L or MISC-E | 240h–24Fh |
| ESS Audio Register 4 | MISC-L or MISC-E | 250h–25Fh |
| Third Modem | MISC-L or MISC-E | 260h–261h |
| Fourth Modem | MISC-L or MISC-E | 270h–271h |
| LPT2 | MISC-L or MISC-E | 278h–27Fh |
| COM4 | MISC-L or MISC-E | 2E8h–2EFh |
| COM2 | MISC-L or MISC-E | 2f8h–2FFh |
| First Audio MPU 401 | MISC-L or MISC-E | 300h–301h |
| Second Audio MPU 401 | MISC-L or MISC-E | 310h–311h |
| Third Audio MPU 401 | MISC-L or MISC-E | 320h–321h |
| Fourth Audio MPU 401 | MISC-L or MISC-E | 330h–331h |
| LPT1 | MISC-L or MISC-E | 378h–37Fh |
| Audio FM Synthesizer | MISC-L or MISC-E | 388h–38Bh |
| LPT3 | MISC-L or MISC-E | 3BCh–3BFh |
| COM3 | MISC-L or MISC-E | 3E8h–3EFh |
| Primary Floppy Disk | MISC-L | 3F3h–3F5h, 3F7h |
| COM1 | MISC-L or MISC-E | 3F8h–3FFh |
| LPT2 Extended | MISC-L or MISC-E | 678H–6Ah |
| LPT1 Extended | MISC-L or MISC-E | 778h–77Ah |
| Programmable I/O Decode 1 | MISC-L or MISC-E | Soft. Programmable |
| Programmable I/O Decode 2 | MISC-L or MISC-E | Soft. Programmable |
| General Purpose I/O 15 Decode | MISC-L or MISC-E | Hard. Programmable |

Figure 3:
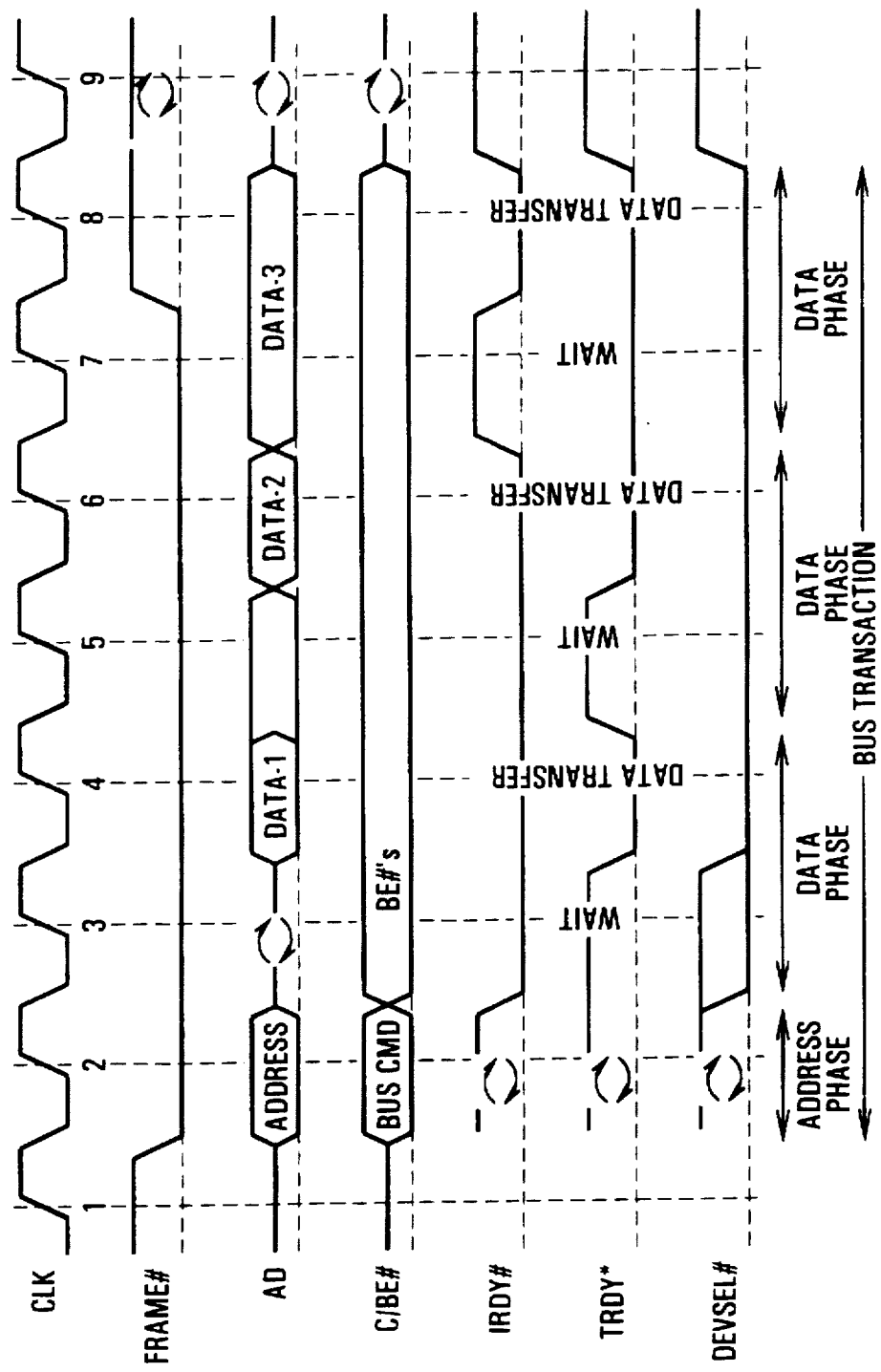
FIG. 3 is a block diagram illustrating a portion of MISC for handling address decode according to the preferred embodiment.

Before addressing further details of the present invention, a brief discussion of PCI transactions is deemed appropriate. Briefly referring to FIG. 3, there is illustrated a PCI read transaction. The signal names for FIG. 3 are generic signal names according to PCI bus convention. Every transaction begins with an address phase, during which the address/data pins (AD) transfer the address and the command/byte enable (C/BE_)transfer the instruction code. One or more data phases follow the address phase, during which the same AD pins transfer data and the C/BE_ signals transfer the byte enable information. In a burst cycle, multiple data phases can follow a single address phase. In PCI terminology, a device on the PCI bus is called an agent. A requesting PCI agent is known as an initiator, such as the CPU 100 or the MISC 118 acting as a bus master; and the addressed PCI agent is known as a target, such as when the CPU 100 writes to the MISC 118. Every transfer starts with the assertion of a FRAME_ signal. All devices on the PCI bus 112 decode the address and bus command and the addressed PCI target claims the cycle by asserting a DEVSEL_ signal. The target indicates its readiness to receive or transfer data by asserting a target ready (TRDY__ signal. In addition, the initiator must also indicate its readiness to the PCI target by asserting an initiator ready (IRDY__ signal. A data phase completes when data is transferred, which occurs when both IRDY__ and TRDY__ are asserted on the same clock edge. When either is deasserted a wait cycle is inserted and no data is transferred. Only when IRDY__ is asserted can FRAME__ be asserted, which concludes the transaction.

Figure 4:
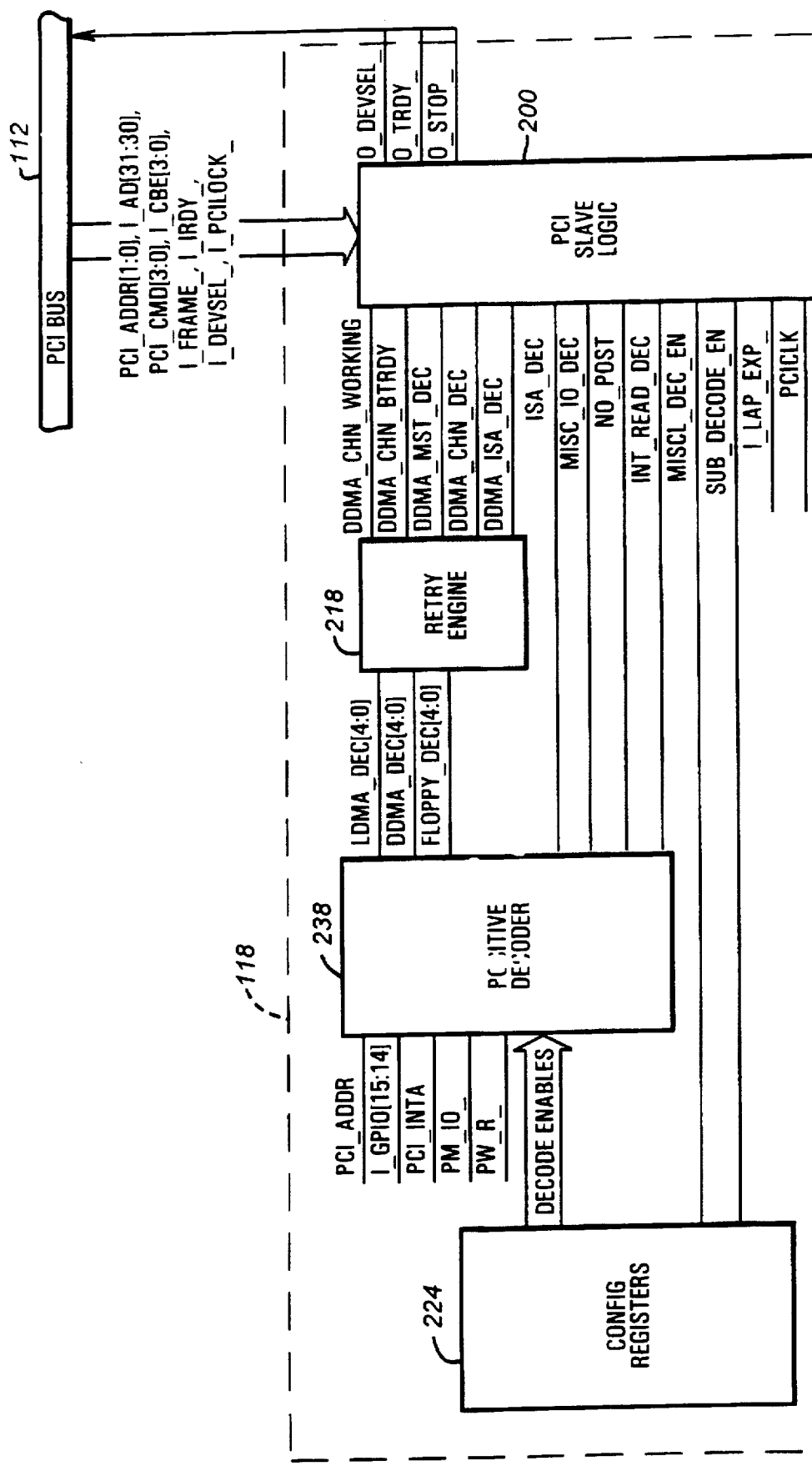
FIG. 4 is a timing diagram illustrating a conventional PCI bus transaction.

Now referring to FIG. 4 there is illustrated a section of the MISC 118 responsible for decoding addresses from the PCI bus 112. The PCI slave logic 200 receives certain signals from the PCI bus 112 or logic internal to the MISC 118, including: a latched version of PCI address bits 0 and 1 (PCI ADDR|1:0|); PCI address/data bits 30-31 (I__AD|31:30|); a latched version of PCI command bits 3-0 (PCI__CMD|3:0|); PCI bus command and byte enable bit 3-0 (I__CBE|3:0|); PCI frame signal (I__FRAME__); PCI ready signal (I__IRDY__); PCI device select signal (I__DEVSEL__); and PCI lock signal (I__PCILOCK__). When acting as a slave on the PCI bus, the MISC 118 provides certain signals to the PCI bus 112, including: the PCI device select signal (O₁₃DEVSEL__); a PCI target ready signal (O__TRDY; and a PCI stop signal(O__STOP__).

The positive decoder 238 receives the PCI address, a plurality of decode enable signals from the configuration registers 224, and various other signals for generating address decode signals. The retry engine 218 receives DMA and floppy decode signals and filters the decode signals for distributed DMA purposes and generates corresponding decode signals. The PCI slave logic 200 receives the decode signals, decode enables from the configuration registers 224 and an internal configuration (I__LAP__EXP__) signal from a MISC 118 input pin for generating a PCI device select (O__DEVSEL__) signal, a target ready (O__TRDY__)signal, and a stop (O__STOP__)signal. The MISC-L decode enable (MISC__DEC__EN) signal and the subtractive decode enable (SUB__DECODE__EN) signal are software configurable bits from the internal I/O positive decoder enable register of the MISC 118. The MISCL__DEC__EN bit, if set, will cause the MISC 118 to positively decode I/O addresses mapped to the MISC 118, and if cleared, the MISC 118 will not positively decode these I/O addresses. Preferably, software will set this bit in the MISC-L 118b and clear this bit in the MISC-E 118b. The SUB__DECODE__EN bit, if set, will cause the MISC 118 to become the subtractive decoder on the PCI bus 112, and if cleared, will cause the MISC 118 to accept cycles only on positively decoded addresses. This bit is configurable by software depending on whether the laptop computer L is docked into the expansion base E. If docked, the bit is set in the MISC-E 118b and cleared in the MISC-L 118a, and if undocked, the bit is set in the MISC-L 118a.

FIGS. 5A-5I and 6 illustrate logic for generating certain select signals according to the preferred embodiment. Those skilled in the art will recognize that other logic circuits will provide equivalent functionality and that the addresses can be changed without departing from the spirit of the invention.

In FIG. 5A there is illustrated a ROM chip select decoder 300 which is used to access the ROM 126. Either the MISC-L 118a or the MISC-E 118b can be programmed to provide a ROM chip select for the decoded memory region, but preferably not both. A number of address comparators 302 are provided for indicating when the ROM 126 is addressed. The MISC 118 contains both fixed and programmable memory regions which determine whether PCI initiated memory cycles are positively decoded and passed to the internal ISA bus 138 behind the MISC-L 118a or are subtractively decoded and passed to the ISA bus 140 behind the MISC-E 118b. A ROM chip select (ROM__CS) signal is positively decoded and asserted during memory read and write cycles to/from the address range 000E0000h to 000FFFFFh and aliased at FFFE0000h to FFFFFFFFh. The ROM chip select decode for the aliased 128k (FFFE0000h-FFFFFFFFh) and the top 64k (000F0000h000FFFFFh) is always enabled and mapped behind the MISC-L 118a by an arbiter master mode (ARB__MASTER) signal from the configuration registers 224. When the MISC 118 is reset, the state of the I__LAP__EXP__ signal causes the MISC-L 118a to be configured as the arbitration master and the MISC-E 118b to be configured as an arbitration slave. Thus, only the MISC-L 118a has the ARB__MASTER signal asserted. The decode for the bottom 64k block (000E0000h-000EFFFFh) is software enabled via a ROM chip select enable (ROMCS__EN) signal from the configuration registers 224. Either the MISC-L 118a or the MISC-E 118b can be setup to decode this memory region, but not both.

In addition to the 128k defined above, the MISC 118 provides an additional 128k decode region located at FFFC0000h to FFFDFFFFh which is software enabled via an alternate ROM chip select enable (A__ROMCS__EN) signal from the configuration registers 224. Either the MISC-L 118a or the MISC-E 118b can be setup to decode this memory region, but not both.

Now referring to FIG. 5B there is illustrated serial port decode logic 304 for accessing the standand asynchronous communications ports, also known as COM1 and COM2. PCI address signals are received into a pair of address comparators 306 for indicating when a COM port is addressed. COM1 is accessed at I/O addresses 3F8-3FFh and COM2 is accessed at I/O addresses 2F8-2FFh. Logic for serial ports COM3 and COM4 is found in FIG. 5D. Signals COM1__DEC and COM2__DEC provide the selection indicators for ports COM1 and COM2 respectively.

Figure 5C:
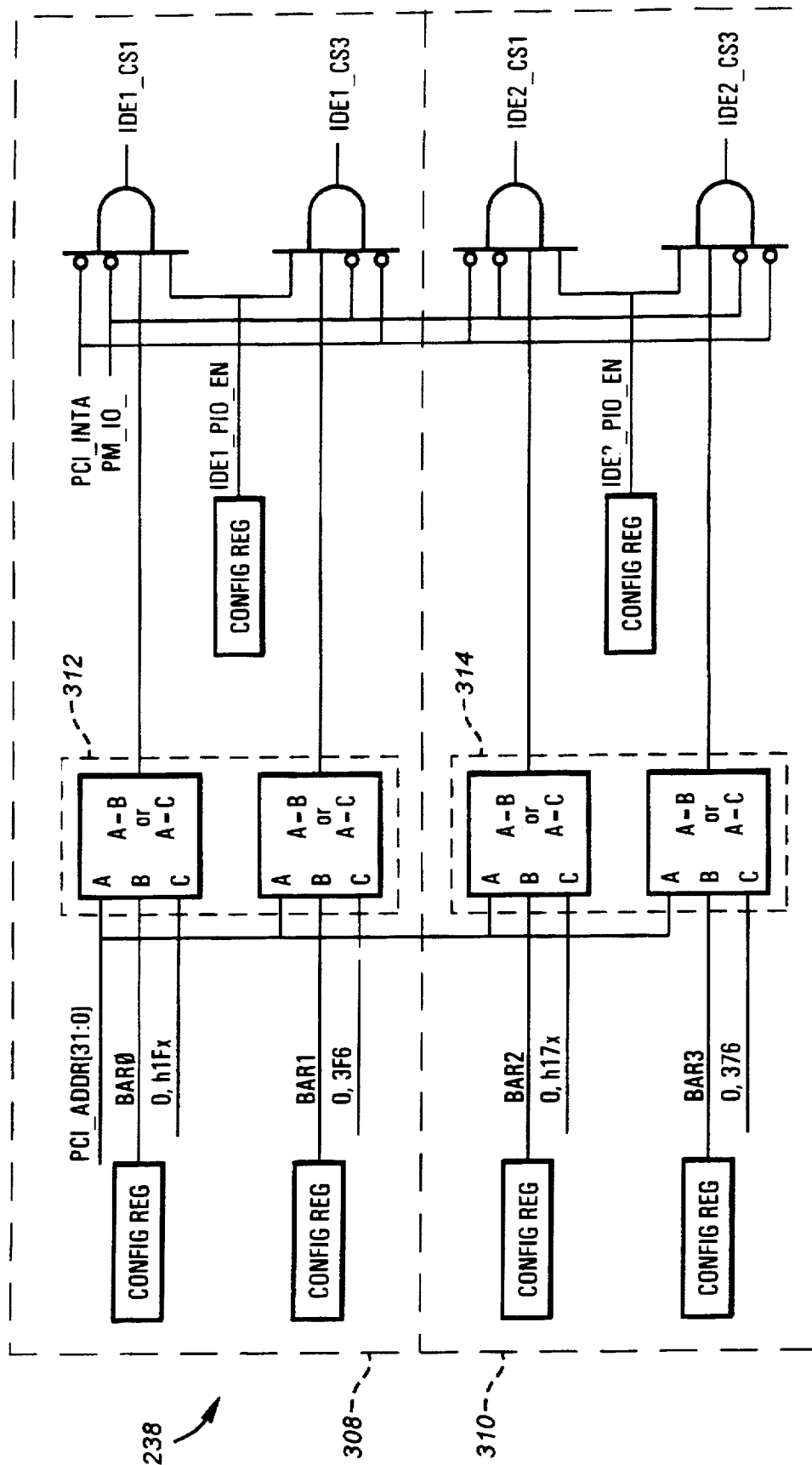

Now referring to FIG. 5C there is illustrated hard drive decode logic 308 and 310 of the MISC 118 for accessing the standard integrated drive electronics (IDE) hard drives and other IDE compatible devices. The decoder 308 provides a IDE1__CS1 signal and an IDE1__CS3 signal for accessing IDE devices on channel 1. A number of address comparators 312 provide an indication when the PCI address equals a legacy address (h1Fx and h3f6) or a programmable base address (BAR0 and BAR1). The decoder 310 provides a IDE2__CS1 signal and an IDE2__CS3 signal for accessing IDE devices on channel 2. A number of address comparators 314 provide an indication when the PCI address equals a legacy address (h17x and h376) or a programmable base address (BAR2 and BAR3). The MISC 118 supports two IDE channels for up to four IDE devices. Each channel is software enabled by the IDE1__PIO__EN signal and IDE2__PIO__EN signal respectively. The enable signals and programmable base addresses are provided from the configuration registers 224. The default I/O address for channel 1 is 1F0-1F7h with status being at 3F6h. The default I/O address for channel 2 is 170-177h with status being at 376h.

Figure 5D:
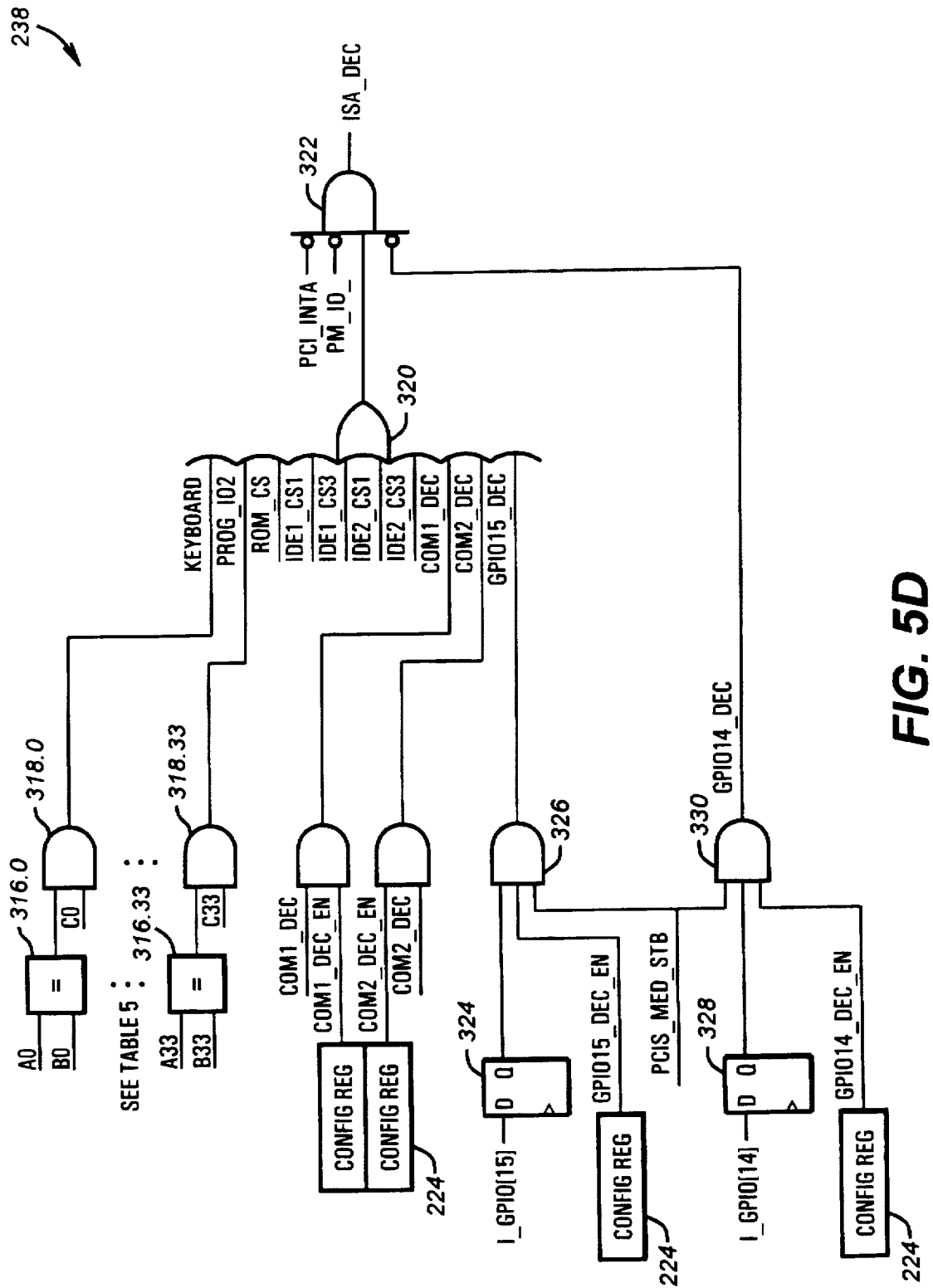

Now referring to FIG. 5D there is illustrated decode logic for a plurality of ISA devices and I/O registers. Reference is directed to Table 5 for a preferred listing of ISA devices and I/O registers decoded by the circuitry of FIG. 5D according to the preferred embodiment. The devices listed in Table 5 each have a select signal which is received into an OR gate 320. Table 5 lists 34 devices with each device having a corresponding I/O address (B) for comparison with certain PCI address bits (A) and qualified with an enable signal (C).

These device numbers are assigned for explanatory convenience only. The logic for comparing and qualifying the select signals is abreviated in FIG. 5D for simplicity. Devices 0–33 are decoded by the logic with reference to Table 5.

The keyboard decode logic is offered as an example. A comparator 316_0 receives PCI address bits 31:0 for comparison with I/O address 60h. An output of the compartor 316_0 is received into a two input AND gate 318_0 for qualification with the MISC 118 decode enable (MISCL_DEC_EN) signal. The output of the AND gate 318_ is provided to the OR gate 320. Devices 1–33, represented as # directly below, are similarly decoded with their outputs provided to the OR gate 320. The devices listed are decoded by an address comparator 316_# where a PCI address A# is compared to a fixed address B# . The output of the equal comparator 316# is received into one input of the AND gate 318_#. A second input of the AND gate 318_# receives an enable signal C# from the configuration registers 224. The output of the AND gate 318_# is received into the multiple input OR gate 320.

The OR gate 320 receives a plurality of decode signals, including the ROM_CS, IDE1_CS1, IDE1_CS3 , IDE2_CS1 , IDE2_CS3 signals. The COM1_DEC and COM2_DEC signals are ANDed with software configurable enable signals, COM1_DEC_EN and COM2_DEC_EN, from the configuration registers 224. The output of the OR gate 320 is received into a non-inverted input of an AND gate 322 and qualified with a PCI_INTA signal, a PM_IO_signal, and a GPIO14_DEC signal. The PCI_INTA signal indicates that a PCI interrupt acknowledge cycle is being performed on the PCI bus 112. The PM_IO_signal indicates a memory or I/O operation is being performed on the PCI bus 112. An output of the AND gate 322 provides an ISA decode (ISA_DEC) signal for indicating that an internal or external ISA I/O register is decoded.

The MISC 118 also provides a mechanism for an external device to request the MISC 118 to positively decode a PCI bus transaction and pass it to the ISA bus. A general purpose input pin GPIO15 is internally connected to a D input of a flipflop 324 by an I_GPIO|15| signal. The Q output of the flip-flop 324 is connected to an input of a three input AND gate 326. The I_GPIO|15| signal is software enabled via a GPIO15_DEC_EN signal from the configuration registers 224 and claimed with medium decode timing via a MED signal. The GPIO15 input pin allows the MISC 118 to positively decode the current PCI cycle and pass it through to the ISA bus 138. A general purpose input pin, GPIO14 is also internally connected to a D input of a flip-flop 328 by an I_GPIO|14| signal. The Q output of the flip-flop 328 is connected to an input of a three input AND gate 330. The I_GPIO|14| signal is software enabled via a GPIO14_DE_EN signal from the configuration registers 224 and claimed with medium timing via the MED signal. The GPIO14 input pin allows the MISC 118 to override any of the address ranges represented by the output of the OR gate 320. Logic (not shown) external to MISC 118 can assert a signal onto either of the general purpose input pins to cause MISC to positively claim the cycle for its respective ISA bus.

TABLE 5

ISA DEVICE ADDRESSES

| # ISA DEVICE (signal to 320) | (A#) PCI_ADDR | (B#) ADDRESS | (C#) ENABLE |
|---|---|---|---|
| 0 Keyboard Decode | 31:0 | 00000060h | MISCL_DEC_EN |
| 1 Keyboard Decode | 31:1 | 0000006h, 010b | MISCL_DEC_EN |
| 2 CMOS/RTC Decode | 31:3 | 00000007h, 0b | RTC_DEC_EN |
| 3 Port 92h Decode | 31:0 | 00000092h | MISCL_DEC_EN |
| 4 ESS Audio Software Configuration Decode | 31:1 | 000000Eh, 000b | MISCL_DEC_EN |
| 5 MSIO Index Address & Data Decode | 31:1 | 000000Eh, 001b | MISCL_DEC_EN |
| 6 MSIO/BGL/Audio Configuration Decode | 31:0 | 000000F9h | MSIO_CFG_EN |
| 7 MSIO/BGL/Audio Configuration Decode | 31:0 | 000000FHh | MSIO_CFG_EN |
| 8 Primary Modem Decode | 31:1 | 0000013h, 000b | MOD1_DEC_EN |
| 9 Primary Modem UTE Audio Decode | 31:2 | 0000013h, 01b | UTEL_DEC_EN |
| 10 Secondary Modem Decode | 31:1 | 0000014h, 000b | MOD2_DEC_EN |
| 11 Joystick Decode | 31:0 | 00000201h | JOYSTK_DEC_EN |
| 12 Secondary Modem UTE Audio Decode | 31:2 | 0000020h, 10b | UTE2_DEC_EN |
| 13 ESS Audio Register 1 Decode | 31:4 | 0000022h | AUD1_DEC_EN |
| 14 ESS Audio Register 2 Decode | 31:4 | 0000023h | AUD2_DEC_EN |
| 15 ESS Audio Register 3 Decode | 31:4 | 0000024h | AUD3_DEC_EN |
| 16 ESS Audio Register 4 Decode | 31:4 | 0000025h | AUD4_DEC_EN |
| 17 Third Modem Decode | 31:1 | 0000026h, 000b | MOD3_DEC_EN |
| 18 Fourth Modem Decode | 31:1 | 0000027h, 000b | MOD4_DEC_EN |
| 19 LPT2 Decode | 31:3 | 0000027h, 1b | IPT2_DEC_EN |
| 20 COM4 Decode | 31:3 | 000002Eh, 1b | COM4_DEC_EN |
| 21 1st Audio MPU Decode | 31:1 | 0000030h, 000b | MPU1_DEC_EN |
| 22 2nd Audio MPU Decode | 31:1 | 0000031h, 000b | MPU2_DEC_EN |
| 23 3rd Audio MPU Decode | 31:1 | 0000032h, 000b | MPU3_DEC_EN |
| 24 4th Audio MPU Decode | 31:1 | 0000033h, 000b | MPU4_DEC_EN |
| 25 LPT1 Decode | 31:3 | 0000037h, 1b | 1PT1_DEC_EN |
| 26 ESS Audio FM Synthesis Decode | 31:2 | 0000038h, 10b | FM_DEC_EN |
| 27 LPT3 Decode | 31:2 | 000003Bh, 11b | 1PT3_DEC_EN |
| 28 COM3 Decode | 31:3 | 000003Eh, 1b | COM3_DEC_EN |
| 29 LPT2 Extended Register Decode | 31:2 | 0000067h, 10b | 1PT2_DEC_EN |
| 30 LPT1 Extended Register Decode | 31:2 | 0000077h, 10b | 1PT1_DEC_EN |
| 31 ISA Wait Register | 31:0 | 00000C6Dh | MISCL_DEC_EN |
| 32 Programmable ISA IO Decode 1 | 31:4 | 0000h, PGM_IO_ADDR1 | PGM_IO_ADDR1_EN |
| 33 Programmable ISA IO Decode 2 | 31:4 | 0000h, PGM_IO_ADDR2 | PGM_IO_ADDR2_EN |

Figure 5E:
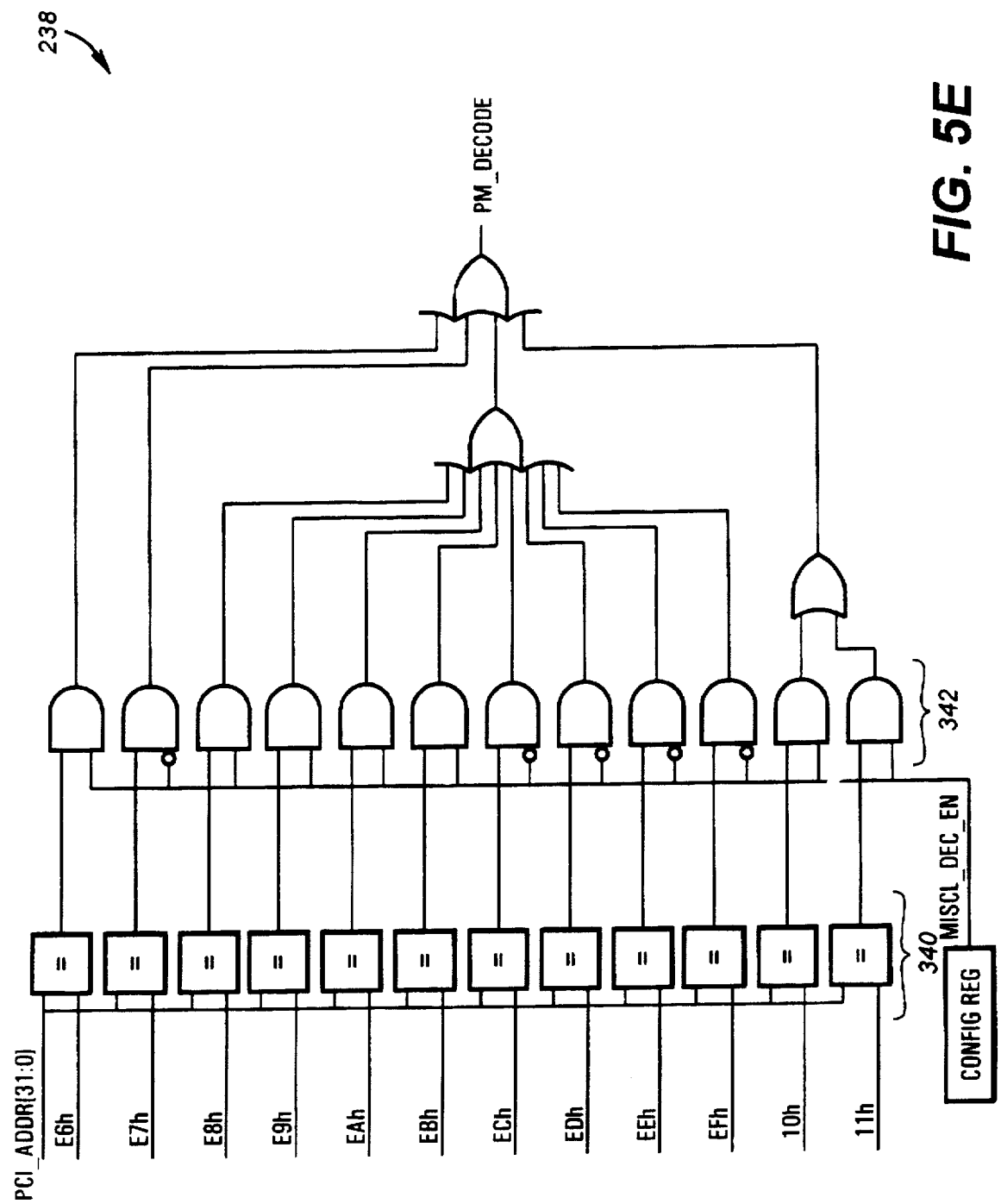

Now referring to FIG. 5E there is illustrated power management decode logic for accessing the power management logic in the MISC-L 118a and the MISC-E 118b. A power managment decode (PM-DECODE) signal indicates when the power management logic in the MISC 118 is being accessed. A number of address comparators 340 compare fixed I/O addresses to the PCI address. The MISCL_DEC_EN signal from the configuration registers 224 qualifies the decoding of certain logic or registers by a number of AND gates 342. Software sets this MISCL_DEC_EN bit upon initialization to always be set in the MISC-L 118a and always cleared in the MISC-L 118b. Therefore, the MISCa 118a will positively decode I/O addresses mapped to power managment registers at E6h, E8h, E9h, EAh, EBh, 10h and 11h and the MISC-E 118b will positively decode I/O addresses mapped to power managment registers at E7h, ECh, EDh, EEh and EFh. If MISCL_DEC_EN is set, power managment registers in the MISC-E 118b are not accessible in the MISC-L 118a, and vica versa.

Figure 5F:
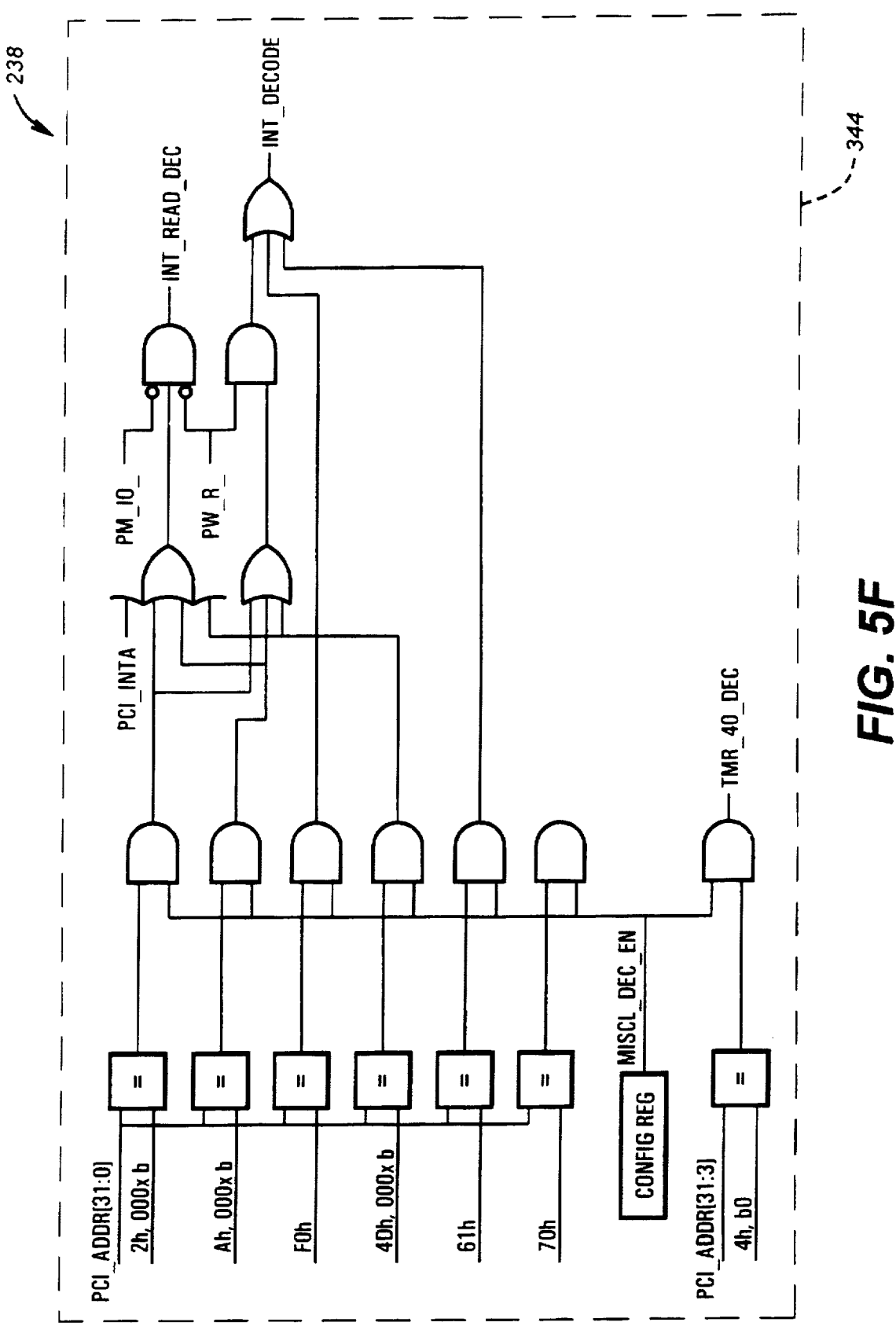

Now referring to FIG. 5F there is illustrated the interrupt controller decode logic and the timer decode logic. An INT_READ_DEC signal indicates when the interrupt controller is being read from and an INT_DECODE signal indicates when the interrupt controller is being written to. A TMR_40_DEC signal indicates when the timer is being accessed. The MISCL_DEC_EN signal qualifies the decoding so that the decode signals are enabled and positively decoded for the MISC-L 118a and disabled for the MISC-E 118b.

Now referring to FIG. 5G there is illustrated non-postable region decode logic 346 for indicating the non-postable PCI I/O decode for ISA devices. A NO_POST signal indicates when I/O addresses 60 or 92 are being accessed, particularly for reset operations, when the GPIO15_DEC signal is asserted or when a NO_POST_EN signal is enabled via the configuration registers 224.

Now referring to FIG. 5H there is illustrated decode logic 348 for the enhanced DMA controller 214. An EDMA_DECODE signal indicates when the enhanced DMA controller is being accessed. An EDMA_DECODE_EN signal enables the decode logic and the MISCL_DEC_EN signal causes the MISC-L 118a to positively decode the EDMA at addresses C14h and C1h.00xxb; and causes the MISC-E 118b to positively decode the EDMA at addresses C1Ch and C1h.10xxb.

Now referring to FIG. 5I there is illustrated logic 350 for indicating when the MISC 118 I/O registers are accessed. A MISC_IO_DEC signal indicates when the enhanced DMA registers (EDMA_DECODE), power managment registers (PM_DECODE), interrupt controller registers (INT_DECODE) or timer registers (TMR_40_DECODE) are being accessed.

Thus, both the MISC-L 118a and MISC-E 118b contain the above described address decode logic for decoding cycles intended for internal and external I/O registers. Although each MISC 118 contains identical logic, software configures the MISC-L 118a and MISC-E 118b so that each has only certain functions enabled. The enable signals from the configuration registers 224 identify which functions are enabled.

Figure 6:
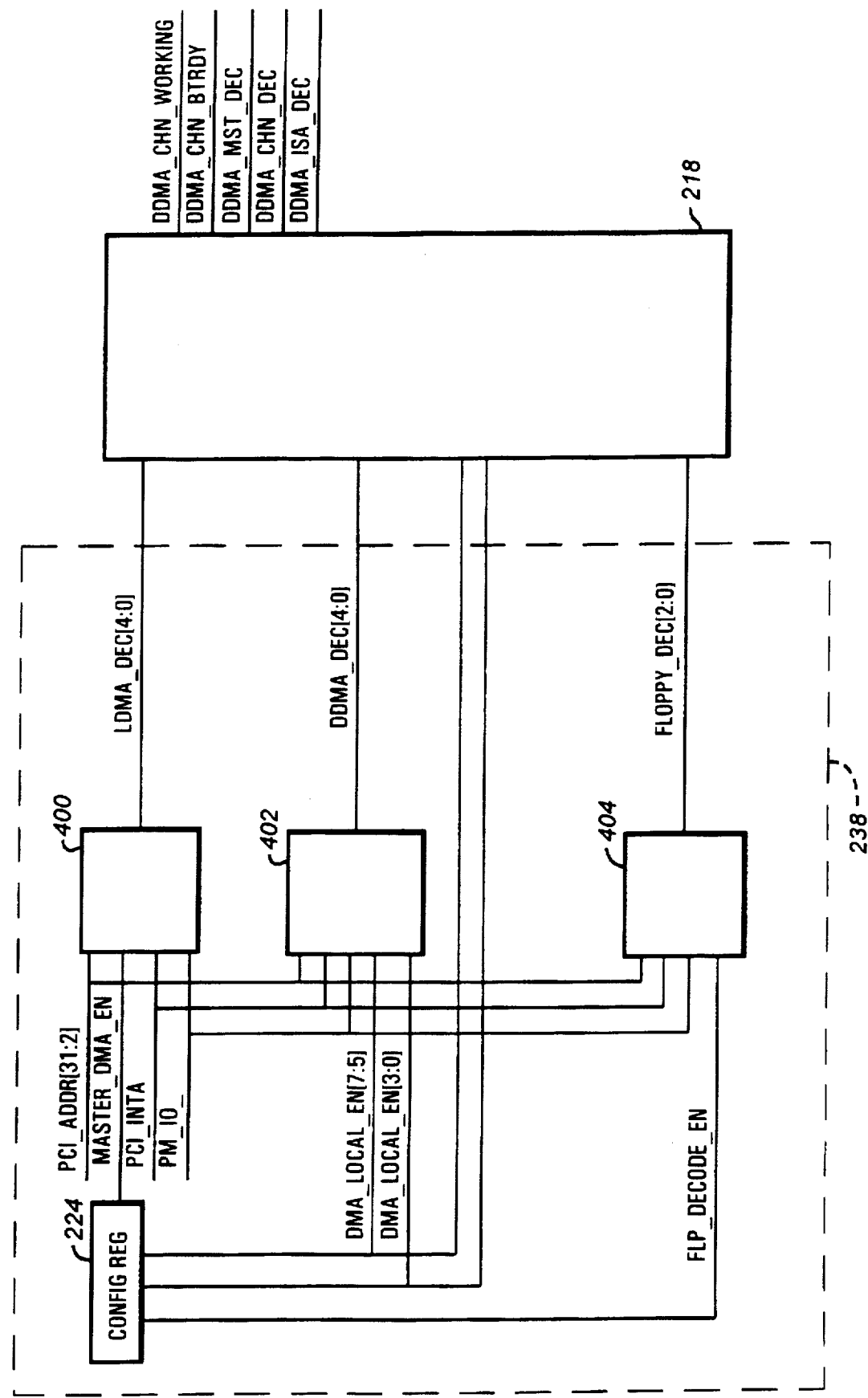
FIG. 6 is a block diagram illustrating logic for decoding direct memory access (DMA) cycles according to the preferred embodiment.

Now referring to FIG. 6, there is illustrated decode logic for the DMA controllers 222 and the floppy disk drive 130. A legacy DMA decode block 400 receives the PCI_ADDR|31:2| bus, a master DMA enable (MASTER_DMA_EN) signal, the PCI_INTA signal and the PM_IO_signal. If any of the registers of the DMA controller 222 are accessed, a LDMA_DEC|4:0| bus indicates the register, otherwise it indicates the idle state. A distributed DMA decode block 402 receives the PCI_ADDR|31:2| bus, the PCI_INTA signal, the PM_IO_ signal and signals indicating whether the distributed DMA channels are local or remote (DMA_LOCAL_EN|7:5,3:0|). If the PCI address corresponds to any registers of local distributed DMA controllers 222, a DDMA_DEC|4:0| bus indicates the register, otherwise it indicates the idle state. A floppy decode block 404 receives the PCI_ADDR|31:2| bus, the PCI_INTA signal and the PM_IO_ signal. If any of the registers correspond to registers of the floppy controller contained in MSIO 124, a FLOPPY_DEC|4:0| bus indicates the register, otherwise it indicates the idle state.

The retry engine 218 of the MISC 118 receives the LDMA_DEC|4:0| bus, the DDMA_DEC|4:0| bus, and the FLOPPY_DEC|4:0| bus to perform distributed DMA operations. A DDMA_CHN_WORKING signal indicates when the distributed DMA state machine is running. A DDMA_CHN_BTRDY signal blocks TRDY_ until cycles are spawned on the ISA bus 140 behind the MISC-E 118b. A DDMA_MST_DEC signal and a DDMA_ISA_DEC signal indicate when the master DMA controller 222 of the MISC-L is accessed. A DDMA_CHN_DEC signal indicates when a distributed DMA channel is accessed.

FIGS. 7A–7G contain miscellaneous circuitry used in the positive and subtractive decoding. Now referring to FIG. 7A there is illustrated a D flip flop 500 and an AND gate 502 receiving a signal indicating when the EISA bus is ready (EISA_READY). An inverted input of the AND gate 502 receives a PCI to EISA cycle start (PCI_START) signal and a non-inverted input receives the output of the flip flop 500. The AND gate 502 produces a data valid signal (EDAV).

Now referring to FIG. 7B there is illustrated logic for indicating when a retry or a retry configuration operation is performed. An AND gate 504 has an input connected to a CLOCK_SLOW_MASK signal and an inverted input connected to a CPU_OWNER signal and an output connected to an input of an OR gate 510. The CLOCK_SLOW_MASK signal masks non-CPU cycles and forces a retry. The CPU_OWNER signal indicates when the CPU owns the bus cycle. An AND gate 506 has an input connected to a latched version of the PCI LOCK (L_PCILOCK) signal, a second input connected to a locked cycle (LOCKED) signal and its output connected to an input of the OR gate 510. An AND gate 508 has an inverted input connected to the LOCKED signal, a second input connected to a refresh hold request (S_RHOLD) signal and a third input connected to an IDE_SD_GNT signal and an output connected to an input of the OR gate 510. The IDE_SD_GNT signal indicates when the EDMA 214 owns the ISA bus 138 or 140. In addition to the abovedescribed signals already received into the OR gate 510, a retry engine retry (REM_RETRY) signal, interrupt controller retry (INT_RETRY) signal and an inverted address latch enable (N_ALE) signal are received into the OR gate 510. An output of the OR gate 510 provides a retry (RETRY) signal.

An OR gate 512 receives the output from the AND gate 506 and has an inverted input connected to the N_ALE signal for producing a retry configuration cycle (RETRY_CONFIG) signal.

Now referring to FIG. 7C there is illustrated a block 514 which receives the PCI command/byte enable signals (I_CBE |3:0|) for anding together those signals and producing a byte enable (NO_BE) signal. A D flip flop 516 receives the NO_BE signal and produces a synchronous version (S_NO_BE). A D flip flop 518 receives the PCI initiator ready signal (I_IRDY) and produces a synchronous version of that signal (S_IRDY). Now referring to FIG. 7D there is illustrated logic for producing the ID selection signal (S_IDSEL) for decoding PCI configuration cycles. A mux 520 has a zero input connected to the PCI address bit 30 (I_AD |30|) and a one input connected to the PCI address/data signal 31 (I_AD |31|), and a selection input connected to the laptop/expansion input pin (I_LAP_EXP_). A D flip flop 522 receives the output of the mux 520 and produces the synchronous ID selection signal (S_IDSEL).

Now referring to FIG. 7E there is illustrated buffering logic 524 and 526 for producing a right/read (PW_R_) signal and a memory/IO (PM_IO_) signal from latched versions of the PCI command/byte enable signals.

Now referring to FIG. 7F there is illustrated logic for indicating when a configuration command is present and when a configuration cycle is occurring. A comparator 528 receives the PCI command signals (PCI_CMD |3:1|) and indicates a configuration command (CONFIG_CMD) when bits 3:1 are equal to 1:0:1. A comparator 530 receives the PCI address bits 1-0 (PCI_ADDR |1:0|) and provides an output to a AND gate 532 when bits 1 and 0 are both equal to 0. The AND gate 532 also receives the CONFIG_CMD signal and provides a CONFIG_CYCLE signal.

Now referring to FIG. 7G there is illustrated logic 534 which is essentially a collection of OR gates for comparing the PCI_CMD [3:0] bus to known invalid PCI command values and producing a an INVALID_CYCLE signal when the values are present.

Figure 7H:
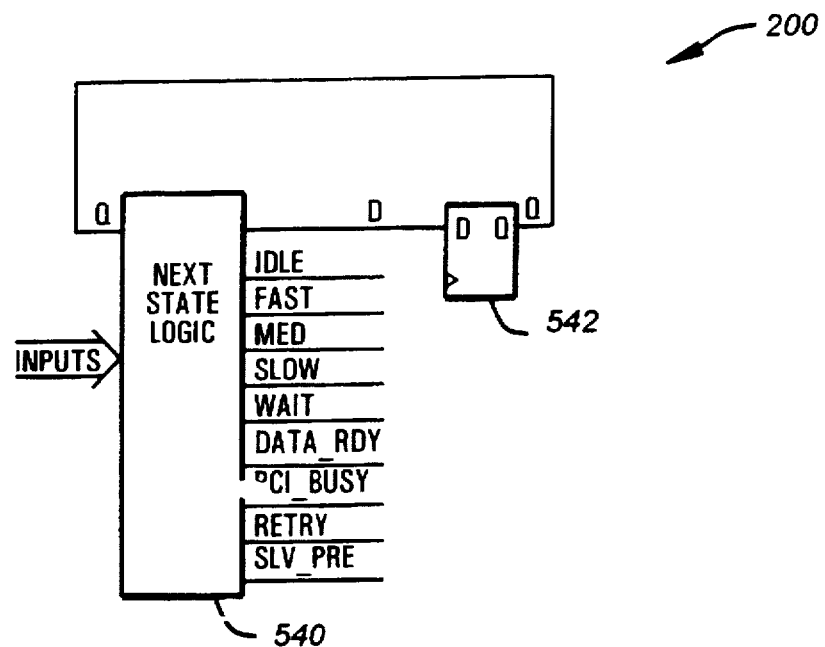
FIG. 7H is a block diagram illustrating a state machine of the MISC according to the preferred embodiment.

Now referring to FIG. 7H there is illustrated a PCI slave state machine of the PCI interface 200. The Q outputs of a flip flop 542 are received into a next state logic block 540 along with the above-described decode signals and output signals of FIGS. 5A–5I and FIG. 6, as shown in FIG. 4. The next state logic clock 540 provides various PCI phase indications to the PCI interface 200 along with a next state indication (D) to the input of the flip flop 542. The state machine of next state logic 540 is described in Table 6.

According to the PCI specification, the device selection signal (DEVSEL#) may be driven one, two or three clocks following the address phase (FIG. 3). The preferred embodiment uses the signals FAST, MED and SLOW, as shown in FIG. 7H to indicate what timing should apply to the O_DEVSEL_ signal. If no agent asserts I_DEVSEL_ within three clocks of FRAME_, either MISC-L 118a or MISC-E 118b as subtractive decode agent will claim and assert O_DEVSEL_. Other signals provided by next state logic 540 include: an idle (IDLE) signal for indicating when the PCI bus is idle; a wait (WAIT) signal for indicating that MISC 118 is holding the PCI bus while waiting for a response; a data ready (DATA_RDY) signal; a PCI bus busy (PCI_BUSY) signal; a PCI bus retry (RETRY) signal; and a slave preemption (SLV_PRE) signal for indicating that the EDMA 214 must give up the ISA bus because a PCI cycle is attempting an ISA bus cycle.

Figure 7I:
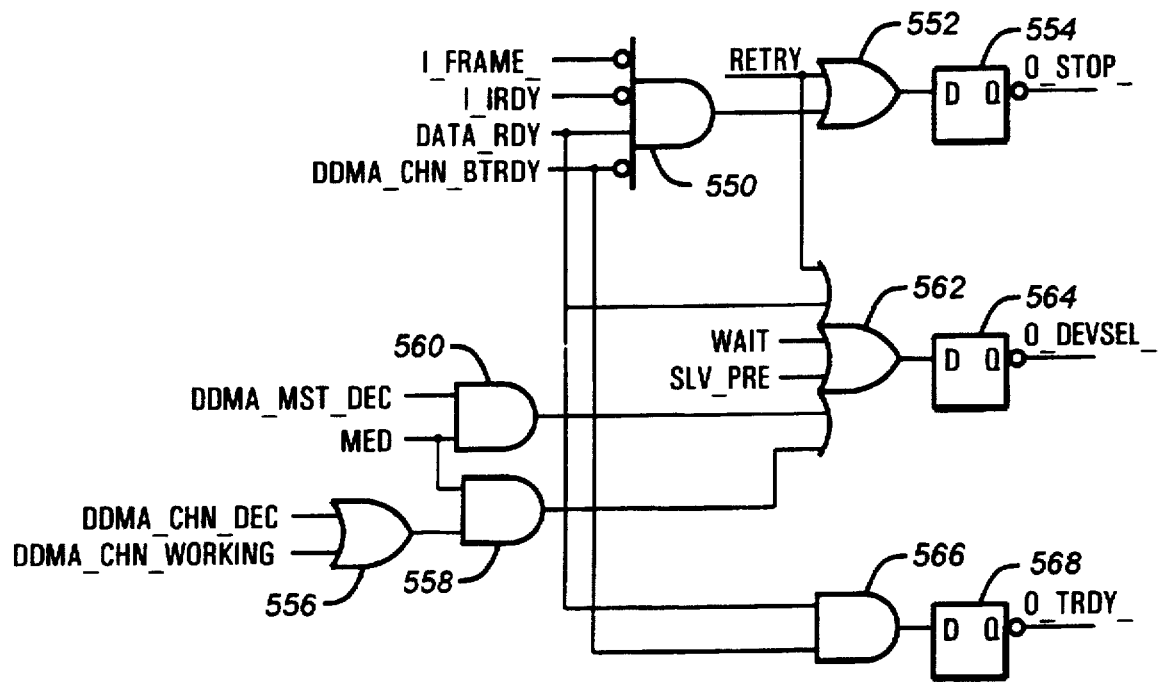
FIG. 7I is a block diagram illustrating logic for generating certain PCI bus control signals.

Now referring to FIG. 7I there is illustrated logic for responding to addresses on the PCI bus and claiming cycles. An AND gate 550 has a first inverted input connected to the I_FRAME_signal, a second inverted input connected to an I_RDY signal, a third inverted input connected to a DDMA_CHN_BTRDY signal and a fourth input connected to a DATA_RDY signal for providing an output to one input of an OR gate 552. A second input to the OR gate 552 receives the RETRY signal and provides an output to the input of a D flip flop 554. An inverted output of the D flip flop 554 provides the PCI stop signal (O_STOP_). An OR gate 556 receives a DDMA_CHN_DEC and DDMA_CHN_WORKING signals for providing an output to an input of a AND gate 558. An input of an AND gate 560 and a second input of the AND gate 558 are connected to an MED signal. A second input of the AND gate 560 is connected to the DDMA_MST_DEC signal. The outputs of AND gates 558 and 560 are provided to inputs of an OR gate 562. The OR gate 562 also receives the RETRY signal, the DATA_RDY signal, a WAIT signal and a SLV_PRE signal for providing an output to the D input of a flip flop 564. An inverted output of the flip flop 564 provides the PCI device select signal (O_DEVSEL_). An AND gate 566 receives the DATA_RDY signal and the DDMA_CHN_BTRDY signal for providing an output to an input of a D flip flop 568. The output of the D flip flop 568 provides the PCI target ready signal (O_TRDY_).

The MISC 118 asserts O_DEVSEL_ positively or subtractively to claim a PCI transaction. When the MISC 118 asserts O_DEVSEL_, it does not negate O_DEVSEL_ until the transaction ends on the PCI bus 112. The PCI specification indicates the device select signal can be asserted to meet fast, medium, slow or subtractive decode timing. If a cycle has not been claimed by a PCI agent by the slow sampling time, the MISC 118 can assert O_DEVSEL_ to subtractively claim the cycle for the ISA bus 138 or 140. If both the MISC-L 118a and the MISC-E 118b are present on the PCI bus 112, then there is agreement by way of the internal I/O positive decode enable configuration register on which agent is responsible for positive and subtractive decoded regions. However, if the laptop computer L is not docked into the expansion base E, then the MISC-L is responsible for both positive and subtractive decoding of its registers, internal devices and devices on the internal ISA bus 138.

Now referring to table 6, there is described the transition conditions for the next state logic 540. Except for a certain few signals, the inputs to next state logic 540, which comprise the CONDITION column of table 6, are described above. The distributed DMA logic includes certain start and stop signals, such as a start (START_PCI_SLV) signal to indicate to the PCI slave logic 200 that a distributed DMA channel is beginning a DMA transfer over the PCI bus 112; and a distributed DMA channel finish (DC_FINISH) signal to indicate to the PCI slave logic 200 when the distributed DMA transfer is finished. A PCI_SD_GNT signal is asserted when the PCI slave 200 owns the ISA bus 138 or 140. A RE_RETRY signal is an internal MISC 118 signal to signify that MISC-L 118a should retry the current cycle.

Of particular importance to the subtractive and positive decode mechanism of the present invention is the use of the subtractive decode (SUB_DECODE_EN) signal provided from the internal I/O positive decode enable configuration register. This signal is used by the state machine to produce the signals received by the logic of FIG. 7I so that the O_DEVSEL_ signal is asserted to subtractively claim a cycle. If a cycle is not positively claimed with FAST, MED or SLOW timing, the MISC 118 with subtractive decoding enabled will subtractively claim the cycle.

Therefore, when the laptop computer L is undocked, the MISC-L 118a will be configured to perform both positive and subtractive decoding. When the laptop computer L is docked into the expansion base E, the MISC-L 118a is configured to positively decode cycles to its internal I/O registers and those ISA devices known to exist on its ISA bus 138 by way of the configuration registers. When docked, the MISC-E 118b is configured to positively decode cycles to its internal and external I/O registers and subtractively decode all other cycles.

TABLE 6
STATE MACHINE TRANSITION TABLE

| STATE | NEXTSTATE | CONDITION |
|---|---|---|
| IDLE: | goto FAST | if((!L_FRAME_ * O_FRAME_) + (START_PCI_SLV)) |
|  | goto IDLE | else |
| FAST: | goto PCI_BUSY | if((INVALID_CYCLE) + (!L_DEVSEL_) + (CONFIG_CMD * (!CONFIG_CYCLE + !S_IDSEL))) |
|  | goto RETRY | else if ((S_IDSEL * CONFIG_CYCLE * RETRY_CONFIG) + (MISC_IO_DEC * RETRY * !CONFIG_CYCLE) + (INT_READ_DEC * RETRY * !CONFIG_CYCLE)) |
|  | goto WAIT | else if(!NO_BE * INT_READ_DEC * !CONFIG_CYCLE) |
|  | goto DATA_RDY | else if((NO_BE * INT_READ_DEC) + (MISC_IO_DEC) + (S_IDSEL * CONFIG_CYCLE * !RETRY_CONFIG)) |
|  | goto MED | else |
| MED: | go to PCI BUSY | if(!L_DEVSEL_ * O_DEVSEL_) |
|  | goto RETRY | else if((!CONFIG_CYCLE * !NO_BE * PCI_SD_GNT * DDMA_ISA_DEC * RETRY) + (!RE_RETRY * DDMA_MST_DEC * !DDMA_ISA_DEC * !S_IRDY_) + (RE_RETRY * DDMA_MST_DEC * !DDMA_ISA_DEC) + (( DDMA_MST_DEC + DDMA_CHN_DEC) * RETRY * !DDMA_CHN_WORKING * !DDMA_ISA_DEC * !CONFIG_CYCLE) + (ISA_DEC * RETRY)) |
|  | goto MED | else if((!RE_RETRY * DDMA_MST_DEC * !DDMA_ISA_DEC * S_IRDY_) + (DDMA_CHN_DEC * !START_PCI_SLV * !DC_FINISH)) |
|  | goto SLV_PRE | else if((!PCI_SD_GNT * DDMA_ISA_DEC) + (DDMA_CHN_DEC * !DDMA_IDS_DEC * START_PCI_SLV * !PCI_SD_GNT) + (RE_RETRY * DDMA_MST_DEC * !DDMA_ISA_DEC * !PCI_SD_GNT * !S_NO_BE) + (ISA_DEC + !PCI_SD_GNT * !S_NO_BE)) |
|  | goto WAIT | else if ((DDMA_CHN_DEC * START_PCI_SLV * PCI_SD_GNT) + (RE_RETRY * !DDMA MST_DEC* !DDMA_ISA_DEC * PCI_SD_GNT * !PW_R_ * !S_NO_BE) + (ISA_DEC * (!PW_R_ + NOPOST) * PCI_SD_GNT * !S_NO_BE) + (!CONFIG_CYCLE * !NO_BE *PCI_SD_GNT * DDMA_ISA_DEC * !RETRY)) |
|  | goto DATA_RDY | else if((DC_FINISH) + (NO_BE * DDMA_ISA_DEC) + (RE_RETRY * DDMA_MST_DEC * !DDMA_ISA_DEC * ((PW_R_ * PCI_SD_GNT) + S_NO_BE)) + NO_BE * (DDMA_MST_DEC + DDMA_CHN_DEC) * !DDMA_ISA_DEC) + (ISA_DEC*((PW_R_ * !NO_POST * PCI_SD_GNT) + S_NO_BE))) |
| SLOW: | goto SLOW | else |
|  | goto RETRY | if(SUB_DECODE_EN * RETRY) |
|  | goto WAIT | else if(SUB_DECODE_EN * !RETRY) * (!S_NO_BE * PCI_SD_GNT * (!PW_R_+ (NO_POST * !PM_IO_)) |
|  | goto DATA_RDY | else if(SUB_DECODE_EN * !RETRY)(PW_R_ * !NO_POST * PCI_SD_GNT) + S_NO_BE) |
|  | goto SLV_PRE | else if(SUB_DECODE_EN) |
|  | goto IDLE | else if(!SUB_DECODE_EN) |
| SLV_PRE: | goto PCI_BUSY | if(!L_DEVSEL) |
|  | goto WAIT | if(PCI_SD_GNT) * (!PW_R_ + NO_POST + RE_NO_POST) |
|  | goto DATA_RDY | else if_PCI_SD_GNT) * !(!PW_R_ + NO_POST + RE_NO_POST) |
|  | goto SLV_PRE | else |
| WAIT: | goto DATA_RDY | if((EDAV * !INT_READ_DEC)+ INT_READY) |
|  | goto WAIT | else |
| DATA_RDY: | goto MED | if(DDMA_CHN_DEC * DDMA_CHN_WORKING * !DC_FINISH) |
|  | goto RETRY | else if(!L_FRAME_ * !L_IRDY_) |
|  | goto IDLE | elseif(L_FRAME_ * !L_IRDY_ * PW_R_) |
|  | goto PCI_BUSY | else if(L_FRAME * !L_IRDY_ * !PW_R_) |
|  | goto DATA_RDY | else |
| RETRY: | goto PCI_BUSY | if(L_FRAME_) |
|  | goto RETRY | else |
| PCI_BUSY: | goto IDLE | if(L_FRAME_ * L_IRDY_) |
|  | goto PCI_BUSY | else |

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:

a processor for providing bus cycles to an industry standard architecture (ISA) bus;

a mezzanine bus coupled to said processor, where the mezzanine bus is comprised of a first and second portion connectable by a connector;

a first ISA bus having input/output devices attached thereto for providing and receiving bus cycles;

a second ISA bus having input/output devices attached and attachable thereto for providing and receiving bus cycles;

a first bridge coupled between the first portion of the mezzanine bus and said first ISA bus, said first bridge decoding bus cycles intended for said input/output devices of said first ISA bus and passing said bus cycles to said input/output devices of said first ISA bus, said first bridge decoding bus cycles from said first ISA bus intended for the first portion of the mezzanine bus and passing said bus cycles to the first portion of the mezzanine bus; and a second bridge coupled between the second portion of the mezzanine bus and said second ISA bus, said second bridge decoding bus cycles intended for said input/output devices of said second ISA bus and passing said bus cycles to said input/output devices of said second ISA bus, said second bridge decoding bus cycles from said second ISA bus intended for the second portion of the mezzanine bus and passing said bus cycles to the second portion of the mezzanine bus.

2. The computer system of claim 1, wherein both said first and second bridges positively decode and claim bus cycles from said mezzanine bus, and wherein one of said first and second bridges subtractively decodes and claims bus cycles from said mezzanine bus.

3. The computer system of claim 1, wherein ISA bus devices are attachable to each said first and second ISA buses, and wherein said first and second bridges are selectably configurable to enable decoding to said ISA bus devices.

4. The computer system of claim 1, said computer system further comprising:

means for detecting when said first and second portions are connected;

wherein if said first and second portions are unconnected, said first bridge subtractively decodes and claims bus cycles not positively decoded, and wherein if said first and second portions are connected, one of said first and second bridges are selectably configurable for subtractive decoding.

5. The computer system of claim 1, further including:

a mass storage system; and a video display system.

6. The computer system of claim 1, wherein said mezzanine bus is a peripheral component interconnect (PCI) bus.

7. A computer system, comprising:

an input device for receiving input from a user;

a processor for providing bus cycles to an industry standard architecture (ISA) bus and said input device;

a mezzanine bus coupled to said processor, where the mezzanine bus is comprised of a first and second portion connectable by a connector;

a first ISA bus having input/output devices attached thereto for providing and receiving bus cycles;

a second ISA bus having input/output devices attached and attachable thereto for providing and receiving bus cycles;

a first bridge coupled between the first portion of the mezzanine bus and said first ISA bus, said first bridge decoding bus cycles intended for said input/output devices of said first ISA bus and passing said bus cycles to said input/output devices of said first ISA bus, said first bridge decoding bus cycles from said first ISA bus intended for the first portion of the mezzanine bus and passing said bus cycles to the first portion of the mezzanine bus; and a second bridge coupled between the second portion of the mezzanine bus and said second ISA bus, said second bridge decoding bus cycles intended for said input/output devices of said second ISA bus and passing said bus cycles to said input/output devices of said second ISA bus, said second bridge decoding bus cycles from said second ISA bus intended for the second portion of the mezzanine bus and passing said bus cycles to the second portion of the mezzanine bus.

8. The computer system of claim 7, wherein both said first and second bridges positively decode and claim bus cycles from said mezzanine bus, and wherein one of said first and second bridges subtractively decodes and claims bus cycles from said mezzanine bus.

9. The computer system of claim 7, wherein ISA bus devices are attachable to each said first and second ISA buses, and wherein said first and second bridges are selectably configurable to enable decoding to said ISA bus devices.

10. The computer system of claim 7, said computer system further comprising:

means for detecting when said first and second portions are connected;

wherein if said first and second portions are unconnected, said first bridge subtractively decodes and claims bus cycles not positively decoded, and wherein if said first and second portions are connected, one of said first and second bridges are selectably configurable for subtractive decoding.

11. The computer system of claim 7, wherein said input device is a keyboard.

12. The computer system of claim 7, further including:

a mass storage system; and a video display system.

13. The computer system of claim 7, wherein said mezzanine bus is a peripheral component interconnect (PCI) bus.

14. A computer system, comprising:

a processor for providing bus cycles to an industry standard architecture (ISA) bus;

a mezzanine bus coupled to the processor, where the mezzanine bus is comprised of a first and second portion connectable by a connector;

a first ISA bus having input/output devices attached thereto for providing and receiving bus cycles;

a second ISA bus having input/output devices attached and attachable thereto for providing and receiving bus cycles;

a first bridge coupled between the first portion of the mezzanine bus and the first ISA bus, the first bridge decoding bus cycles intended for the input/output devices of the first ISA bus and passing the bus cycles to the input/output devices of the first ISA bus, the first bridge decoding bus cycles from the first ISA bus intended for the first portion of the mezzanine bus and passing the bus cycles to the first portion of the mezzanine bus;

a second bridge coupled between the second portion of the mezzanine bus and the second ISA bus, the second bridge decoding bus cycles intended for the input/output devices of the second ISA bus and passing the bus cycles to the input/output devices of the second ISA bus, the second bridge decoding bus cycles from the second ISA bus intended for the second portion of the mezzanine bus and passing the bus cycles to second portion of the mezzanine bus;

a mass storage system; and a video display system.

15. The computer system of claim 14, wherein both the first and second bridges positively decode and claim bus cycles from the mezzanine bus, and wherein one of the first and second bridges subtractively decodes and claims bus cycles from the mezzanine bus.

16. The computer system of claim 14, wherein ISA bus devices are attachable to each the first and second ISA buses, and wherein the first and second bridges are selectably configurable to enable decoding to the ISA bus devices.

17. The computer system of claim 14, further comprising:

means for detecting when the first and second portions are connected;

wherein if the first and second portions are unconnected, the first bridge subtractively decodes and claims bus cycles not positively decoded, and wherein if the first and second portions are connected, one of the first and second bridges are selectably configurable for subtractive decoding.

18. The computer system of claim 14, wherein the mezzanine bus is a peripheral component interconnect (PCI) bus.

19. A method for utilizing two ISA busses in a computer system, the method comprising the steps of:

coupling a first ISA bus to a first portion of a mezzanine bus with a first bridge;

coupling a second ISA bus to a second portion of the mezzanine bus with a second bridge;

detecting when the first portion and the second portion of the mezzanine bus are connected;

enabling the first bridge to subtractively decode for the first ISA bus if the first and second portions of the mezzanine bus are not connected; and enabling either the first bridge or the second bridge to subtractively decode if the first and second portions of the mezzanine bus are connected.

* * * * *